(12) United States Patent
Elford

(10) Patent No.: US 12,358,093 B2
(45) Date of Patent: Jul. 15, 2025

(54) INCREMENTAL SHEET FORMING SYSTEMS AND METHODS FOR FORMING STRUCTURES HAVING STEEP WALLS

(71) Applicant: THE BOEING COMPANY, Chicago, IL (US)

(72) Inventor: Michael C. Elford, Springfield (AU)

(73) Assignee: The Boeing Company, Chicago, IL (US)

(*) Notice: Subject to any disclaimer, the term of this patent is extended or adjusted under 35 U.S.C. 154(b) by 592 days.

(21) Appl. No.: 17/711,180

(22) Filed: Apr. 1, 2022

(65) Prior Publication Data
US 2022/0410330 A1    Dec. 29, 2022

Related U.S. Application Data

(60) Provisional application No. 63/214,866, filed on Jun. 25, 2021.

(51) Int. Cl.
*B23Q 15/14* (2006.01)
*B23Q 15/12* (2006.01)

(52) U.S. Cl.
CPC .............. *B23Q 15/14* (2013.01); *B23Q 15/12* (2013.01)

(58) Field of Classification Search
CPC ........ B21D 22/18; B23Q 15/12; B23Q 15/14; B24D 15/023; B24D 11/00; B24D 11/001
See application file for complete search history.

(56) References Cited

U.S. PATENT DOCUMENTS

| | | | | |
|---|---|---|---|---|
| 3,497,928 A | * | 3/1970 | Coen | H04R 31/00 29/6.1 |
| 5,960,526 A | * | 10/1999 | Natali | B23P 17/00 312/265.5 |
| 2009/0250834 A1 | * | 10/2009 | Huskamp | B29C 33/3842 264/219 |

(Continued)

FOREIGN PATENT DOCUMENTS

WO    WO 2020/168211    8/2020

OTHER PUBLICATIONS

Do Van-Cuong et al: "Effect of Hole Lancing on the Forming Characteristic of Single Point Incremental Forming," Procedia Engineering, Elsevier, vol. 184, pp. 35-42 (2017).

(Continued)

*Primary Examiner* — Joel D Crandall
(74) *Attorney, Agent, or Firm* — Joseph M. Butscher; The Small Patent Law Group, LLC

(57) ABSTRACT

A system and method for forming a structure with steep walls (walls having an angle greater than 60° with respect to a level plane) through one or more incremental sheet forming operations is provided. The method includes a workpiece with an inner region and an outer region that are separated by a boundary region. The boundary region includes a plurality of openings and a plurality of connecting elements. The openings are cut into the workpiece using a boundary region cutting tool. A forming tool is configured to operate on the inner region after the boundary region cutting operation has been completed. At least one control unit is in communication with the forming tool. The at least one control unit operates the forming tool to form the structure from the inner region.

20 Claims, 21 Drawing Sheets

(56) References Cited

U.S. PATENT DOCUMENTS

| | | | |
|---|---|---|---|
| 2016/0067906 A1* | 3/2016 | Elford | B21D 31/005 |
| | | | 425/150 |
| 2018/0264538 A1* | 9/2018 | Roth | B21D 31/005 |
| 2019/0017815 A1* | 1/2019 | Nakagawa | G01B 11/2513 |
| 2021/0121931 A1* | 4/2021 | Uchiyama | B21D 31/005 |

OTHER PUBLICATIONS

McAnulty: "Formability in Single Point Incremental Forming: A Comparative Analysis of the State of the Art," CIRP Journal of Manufactuign Science and Technology, Elsevier, vol. 16, pp. 43-54 (2016).
Extended European Search Report for EP 22163160.9-1103, dated Sep. 9, 2022.
Jackson et. al, The Mechanics of Incremental Sheet Forming, Journal of Material Processing Technology, 2009.
Allwood et. al, The Effect of Partially Cut-Out blanks on Geometric Accuracy in Incremental Sheet Forming, Journal of Material Processing Technology, 2010.
Do Van-Coung et al: "Formability and effect of hole bridge in the single point incremental forming", International Journal of Precision Engineering and Manufacturing, Korean Society for Precision Engineering, Springer, vol. 18., No. 3 (2017).
Raji Malhotra et al: "Accumulative-DSIF strategy for enhancing process capabilities in incremental forming", CIRP Annals, vol. 61, No. 1, pp. 251-254 (retrieved 2012).
Communication re EP 22163160.9-1103, dated Nov. 18, 2024.

\* cited by examiner

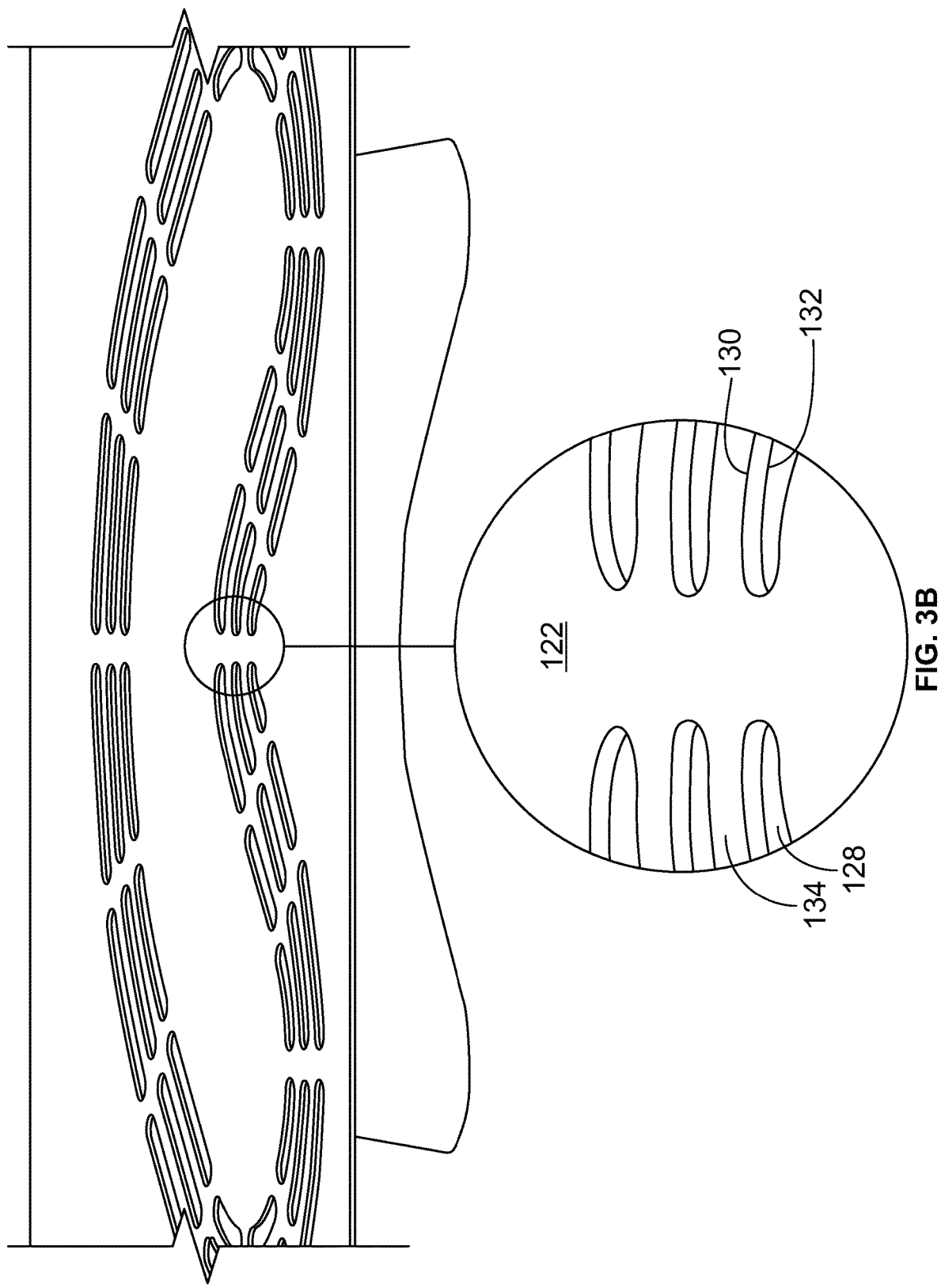

INCREMENTAL SHEET FORMING SYSTEMS AND METHODS FOR FORMING STRUCTURES HAVING STEEP WALLS

CROSS-REFERENCE TO RELATED APPLICATIONS

This application relates to and claims priority benefits from U.S. Provisional Patent Application No. 63/214,866, filed Jun. 25, 2021, which is hereby incorporated by reference in its entirety.

FIELD OF THE DISCLOSURE

Embodiments of the present disclosure relate to alterations to a workpiece which enable incremental sheet forming operations to be successfully applied to manufacturing structures having steep walls.

BACKGROUND OF THE DISCLOSURE

Certain structures are formed through incremental sheet forming. Incremental sheet forming includes forming a structure or a workpiece by a series of incremental forming operations, or plastic deformations on/to a starting blank from which the structure or workpiece is to be formed. In particular, incremental sheet forming provides a method of forming thin structures from metal. Incremental sheet forming is used to form structures without the need for expensive steel dies, for example. Instead, a forming tool typically includes a smooth, blunt operative head that is pushed or otherwise positioned against a surface of sheet metal that is suspended in a clamp, jig, or the like to provide a modified three-dimensional shape.

During an incremental sheet forming process, the forming tool (such as a forming stylus) traverses a tool path to incrementally deform a blank sheet of metal. It is common to generate the tool path from a stack of level sections of a geometry of the part to be formed, which is known as a Z level tool path.

Incremental sheet forming processes are known to be sensitive to a local wall slope angle. In general, structures having wall angles steeper than sixty degrees from a level, reference plane (for example, a horizontal plane) are typically not feasible candidates for incremental sheet forming. In general, blank material used to form a structure does not draw in laterally during incremental sheet forming, but instead moves vertically. As such, at wall angles greater than sixty degrees with respect to a horizontal plane, the sheet of metal formed through an incremental sheet forming process typically thins to less than one half of the original thickness. It has been found that attempting to form such structures through incremental sheet forming risks tearing the steep walls of the material.

SUMMARY OF THE DISCLOSURE

A need exists for a system and method of forming a structure having steep walls (for example, walls angled at sixty degrees or greater relative to a level, reference plane) through incremental sheet forming. Further, a need exists for an incremental sheet forming system and method that are not susceptible to damaging (for example, tearing) structural material at steep angles (for example, sixty degrees or greater).

With those needs in mind, certain embodiments of the present disclosure provide a system for forming a structure. The system includes a workpiece including a boundary region that segregates a portion of the workpiece from a remainder of the workpiece. The boundary region includes a plurality of openings and a plurality of connecting elements that connect the portion to the remainder of the workpiece. A forming tool is configured to operate on the portion after the boundary region has been cut into the workpiece. At least one control unit is configured to command a position of the forming tool. The at least one control unit is configured to operate the forming tool to form the structure through one or more incremental sheet forming operations.

In at least one example, the system also includes a boundary region cutting tool configured to cut the plurality of openings of the boundary region into the workpiece. As an example, the plurality of openings defined by the boundary region are cut between and through a first surface and a second surface of the workpiece in a direction which is normal to either surface or both surfaces.

In at least one example, one or both of an inner boundary region curve or an outer boundary region curve maintain a fixed offset distance from a perimeter of a die which is projected orthogonally onto the plane of the initial workpiece.

In at least one example, the boundary region includes a plurality of slot openings that follow a shape of a die perimeter, and are staggered with respect to successive nested layers.

In at least one example, the plurality of connecting elements include a plurality of individual straight ligaments connecting an inner boundary region curve and an outer boundary region curve. The ligaments may be connected only at attachment points with the inner boundary region curve and the outer boundary region curve. Further, centerlines of the connecting elements can be aligned toward or collinear with a tangent to the inner boundary region curve at inner attachment points.

In at least one example, the boundary region is in the form of a perforated metal sheet. The perforated metal sheet includes a repeating unit cell containing a single opening of a specific shape, repeated in one or more sizes.

In at least one example, the plurality of connecting elements connect an inner boundary region curve and an outer boundary region curve. Extendable ligaments have a shape in a plane of the workpiece.

In at least one example, each of the plurality of connecting elements intersects at least one other of the plurality of connecting elements.

As an example, the plurality of connecting elements include ligaments connected to an inner and outer rim. The ligaments are arranged in a pattern of spokes.

As an example, the connecting elements include curved portions.

In at least one embodiment, a structure is removed from the connecting elements after the forming tool forms the structure.

The forming tool can be a stylus including a bull-nosed or toroidal operative end.

In at least one embodiment, the structure includes a steep wall connected to a flange. The steep wall is at is at an angle of at least 60 degrees with respect to a level reference plane.

In at least one example, the workpiece includes a sheet blank of a given thickness. The plurality of openings and the plurality of connecting elements allow for draw-in of material of the workpiece during the one or more incremental sheet forming operations such that the steep wall maintains a thickness that is at least a threshold percentage of the blank thickness. The threshold percentage can be at least 50%.

In at least one example, the boundary region is between an inner region and an outer region. The boundary region, the inner region, and the outer region are formed of the same material.

Certain embodiments of the present disclosure provide a method for forming a structure. The method includes cutting a boundary region pattern between an inner boundary region curve and outer boundary region curve on a workpiece, wherein the boundary region pattern includes a plurality of openings and a plurality of connecting elements; and performing, using a forming tool, one or more incremental sheet forming operations on the structure to be formed in order to form the structure, wherein the cutting and the performing are conducted after the boundary region pattern has been established.

Certain embodiments of the present disclosure provide a method of cutting a boundary region into a workpiece. The boundary region includes a plurality of openings between a plurality of connecting elements. The method includes receiving, by a boundary region cutting tool, boundary region data indicative of the boundary region; and operating, by the boundary region cutting tool, on the workpiece according to the boundary region data to provide the boundary region.

Certain embodiments of the present disclosure provide a method including selecting boundary region data based on a structure to be formed through one or more incremental sheet forming operations, wherein the boundary region data relates to a boundary region that includes a plurality of openings and a plurality of connecting elements that allow for draw-in of material of a workpiece during one or more incremental sheet forming operations such that a steep wall of the structure maintains a thickness that is at least a threshold percentage of a blank thickness of the workpiece.

BRIEF DESCRIPTION OF THE DRAWINGS

FIG. 3B illustrates a perspective view of a boundary region, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Incremental sheet forming generally deforms material in a different manner when compared to traditional sheet metal forming techniques such as deep drawing or hydroforming. For example, during incremental sheet forming, the sheet material generally does not draw in during the forming process and as a result it is recognized that a limitation of conventional incremental sheet forming is the wall angle of the part geometry to be formed.

Figure 1:
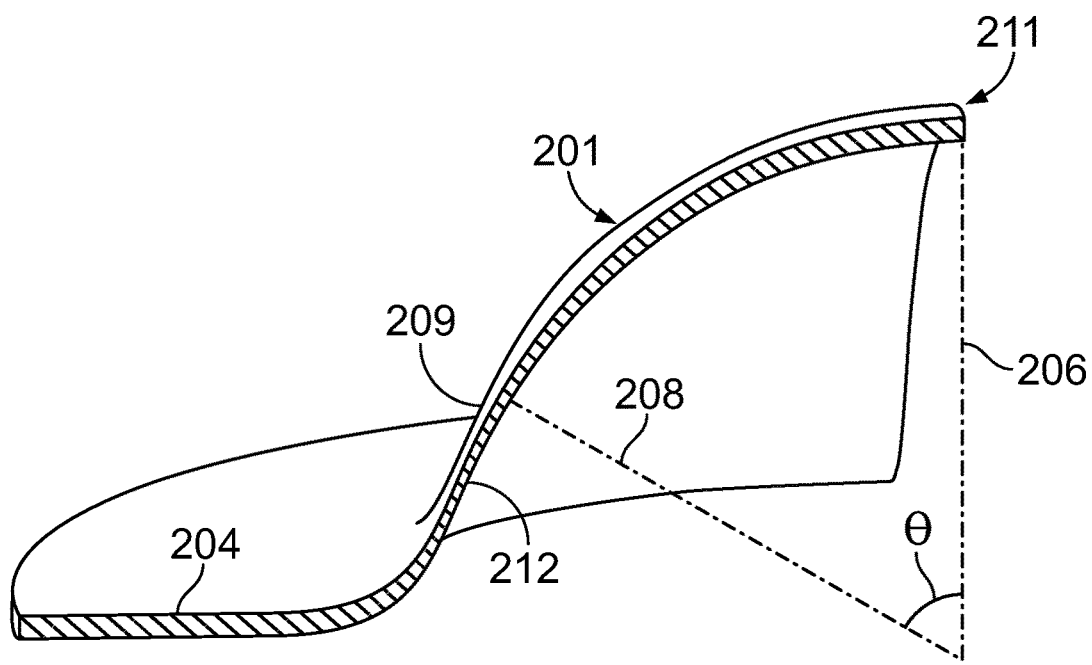
FIG. 1 illustrates a cut away view of an example structure that has been incrementally sheet formed.

FIG. 1 illustrates a cut-away view of a hemisphere 201 with a flange 204 (flanges 204 also shown in FIGS. 9, 14, 23, and 28, for example) that has been incrementally sheet formed. Point 209 represents an arbitrary point on the hemispherical surface. The normal to the surface at this point is the line 208. The line 206 is a vertical line. The angle subtended between line 208 and line 206 is the angle θ. Using the sine law, the residual thickness (t) at point 209 can be estimated as a fraction of the blank thickness ($t_{blank}$) as follows:

$$t = t_{blank} \cos(\theta)$$

For example, the thickness of a 45° wall will be approximately 70.7% of the blank thickness, and the thickness of a 60° wall will be approximately 50% of the blank thickness. As shown in FIG. 1, the point 211 at which the residual thickness is highest is at the location where the wall angle θ is zero. The thinnest material occurs at point 212 where the wall angle θ reaches its highest value. It has been found that parts with wall angles which exceed 60° commonly tear during conventional incremental sheet forming operations.

Certain embodiments of the present disclosure provide systems and methods for forming a structure through incremental sheet forming where the wall angle θ exceeds 60° in at least one region of the part geometry. Within examples, the systems and methods include a workpiece, such as a blank sheet of metal.

Figure 2:
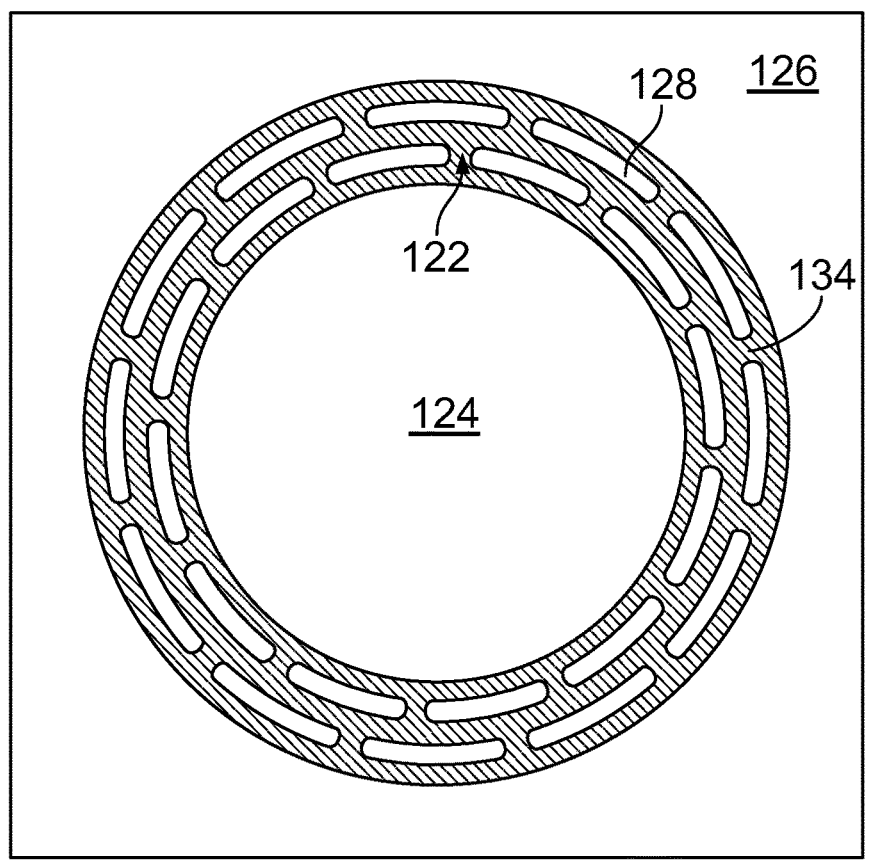
FIG. 2 illustrates a top view of a workpiece containing staggered conformal slot openings, according to an embodiment of the present disclosure.

FIG. 2 shows one embodiment of a workpiece. Referring to this figure, the workpiece 110 may be demarcated into an inner region 124 (for example, a portion of the workpiece 110), a boundary region 122 (shown in cross hatch) and an outer region 126 (for example, the remainder of the workpiece 110). The boundary region 122 segregates the inner region 124 from the outer region 126. Prior to forming, the boundary region 122 is established using a boundary region cutting tool (such as boundary region cutting tool 120 shown in FIG. 3) to remove material from workpiece 110. After the cutting operation is completed, boundary region 122 includes a plurality of openings, where material has been cut away from the workpiece, and a plurality of connectors where material has been retained. Connectors may be in the form of ligaments, chains, lattices, and/or the like.

The boundary region 122 includes a plurality of openings 128, such as holes, cut through the workpiece 110 between and through a first surface 130 (such as a top surface), and a second surface 132 (such as a bottom surface) that is opposite from the first surface 130. In at least one embodiment, the cutting direction is normal to the first or second surface, or both, at the point of cutting. Cutting the plurality of openings into boundary region 122 leaves a plurality of connectors 134 (also referred to herein as connecting elements) that connect the inner region 124 to the outer region 126. The workpiece 110 can include more or less connectors 134 and openings 128 than shown.

In at least one embodiment, the workpiece 110 is an initial structure, such as a blank piece of metal (such as an alloy of aluminum, titanium, copper, or the like). For example, the initial structure may be a planar piece of metal (e.g., a sheet blank) held within clamps and supported on a die, such as in the case of two point incremental forming.

The portion of the workpiece 110 that is to be deformed plastically in order to manufacture a part is the inner region 124, while the outer region 126 may not be deformed directly by the forming tool 108. The inner region 124 is inboard from the boundary region 122 and the outer region 126. The inner region 124 is generally a flat sheet of material that is to be operated on by the forming tool 108 to form a structure (for example, a part). The inner region 124, the boundary region 122, and the outer region 126 can be sized and shaped other than shown.

In at least one embodiment, the boundary region cutting tool is a CNC cutting tool such as a laser cutting tool, plasma cutting tool, water jet cutting device, router tool, milling tool, drilling tool or the like. In other embodiments, the boundary region cutting tool can be a manually operated power tool designed to remove material from sheet metal such as a jigsaw, angle grinder, drill, milling device or routing device. In other embodiments the boundary region cutting tool can be a manually operated device which utilizes heat to remove material from sheet metal such as a handheld plasma cutter or oxyacetylene torch. In further embodiments the cutting tool may comprise of a manually operated unpowered tool such as tin snips, compound action snips or the like.

In at least one embodiment, the boundary cutting tool is replaced by a process and/or tool to remove material in openings 128 of workpiece 110 chemically such chemical etching, chemical milling or the like. In another embodiment, the boundary cutting tool is replaced by a process and/or tool to remove material in openings 128 of workpiece 110 electrically such as electrical discharge machining or the like.

Figure 3A:
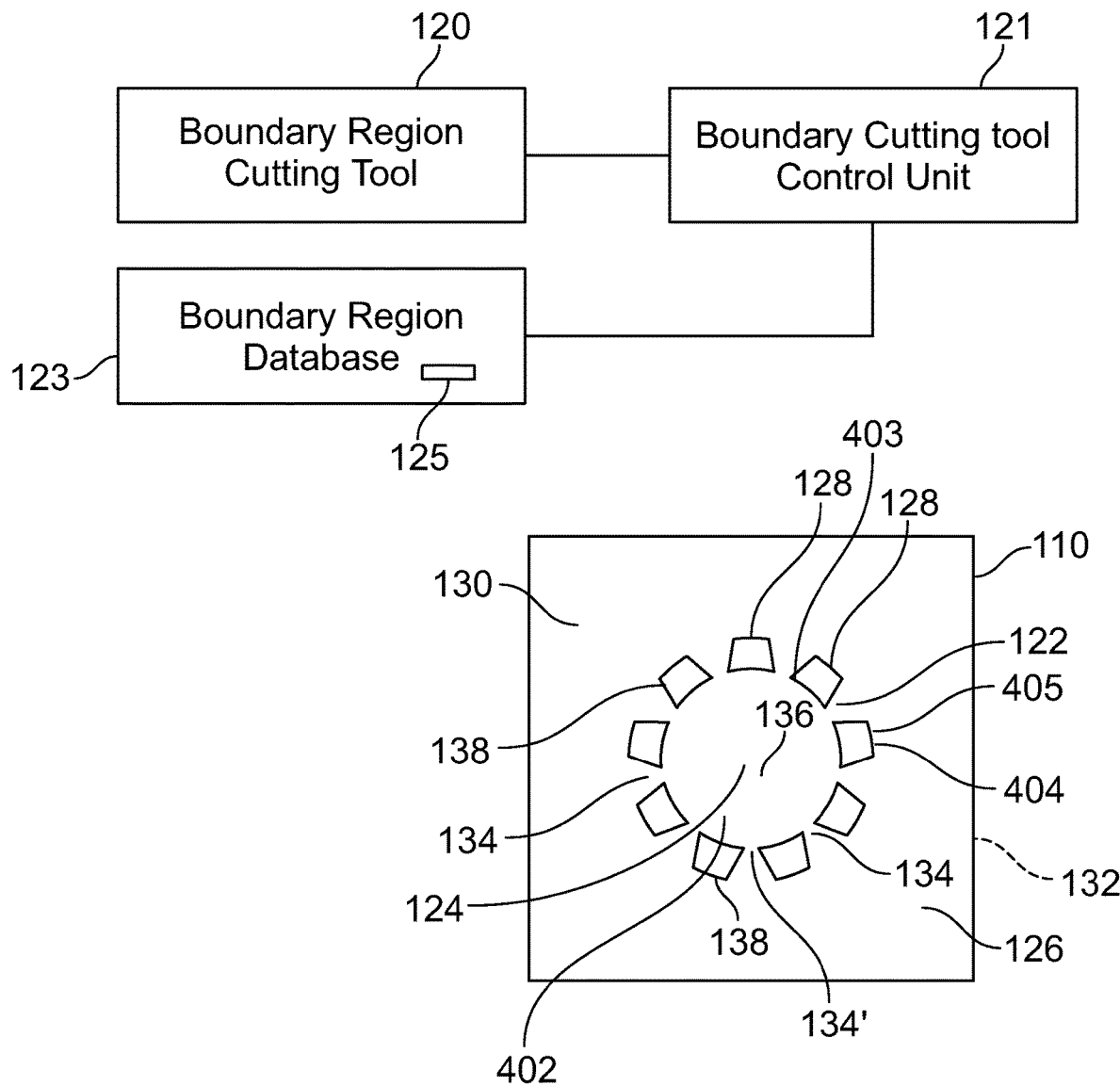
FIG. 3A illustrates a schematic block diagram of a boundary region cutting tool and a workpiece, according to an embodiment of the present disclosure.

FIG. 3A illustrates a schematic block diagram of a boundary region cutting tool 120 and the workpiece 110, according to an embodiment of the present disclosure for which the boundary cutting operation is a CNC type operation. FIG. 3B illustrates a perspective view of a boundary region 122, according to an embodiment of the present disclosure. The boundary region cutting tool 120 is controlled by a boundary cutting tool control unit 121 to cut openings 128 into a boundary region 122 within the workpiece 110.

A boundary region database 123 in communication with the boundary region cutting tool control unit 121 stores various data regarding boundary regions for workpieces. For example, the boundary region database 123 stores target data 125. In operation, the boundary region cutting tool control unit 121 processes the target data 125 in order to generate a toolpath suitable for cutting openings 128 into the workpiece 110. The target data 125 may include information regarding the size, shape, and features of the pattern of openings in boundary region 122 of the workpiece 110. For example, the target data 125 may include a discrete geometric definition, such as a tessellation, of a target pattern of openings 128, which may include one or more inward features. Such may be, for example, in the format of a DWG, DXF or PLY file. Optionally, the target data 125 may include a collection of trimmed parametric curves and points. Such may be, for example, in the format of a STEP, SAT, Parasolids, or IGES file.

Figure 4:
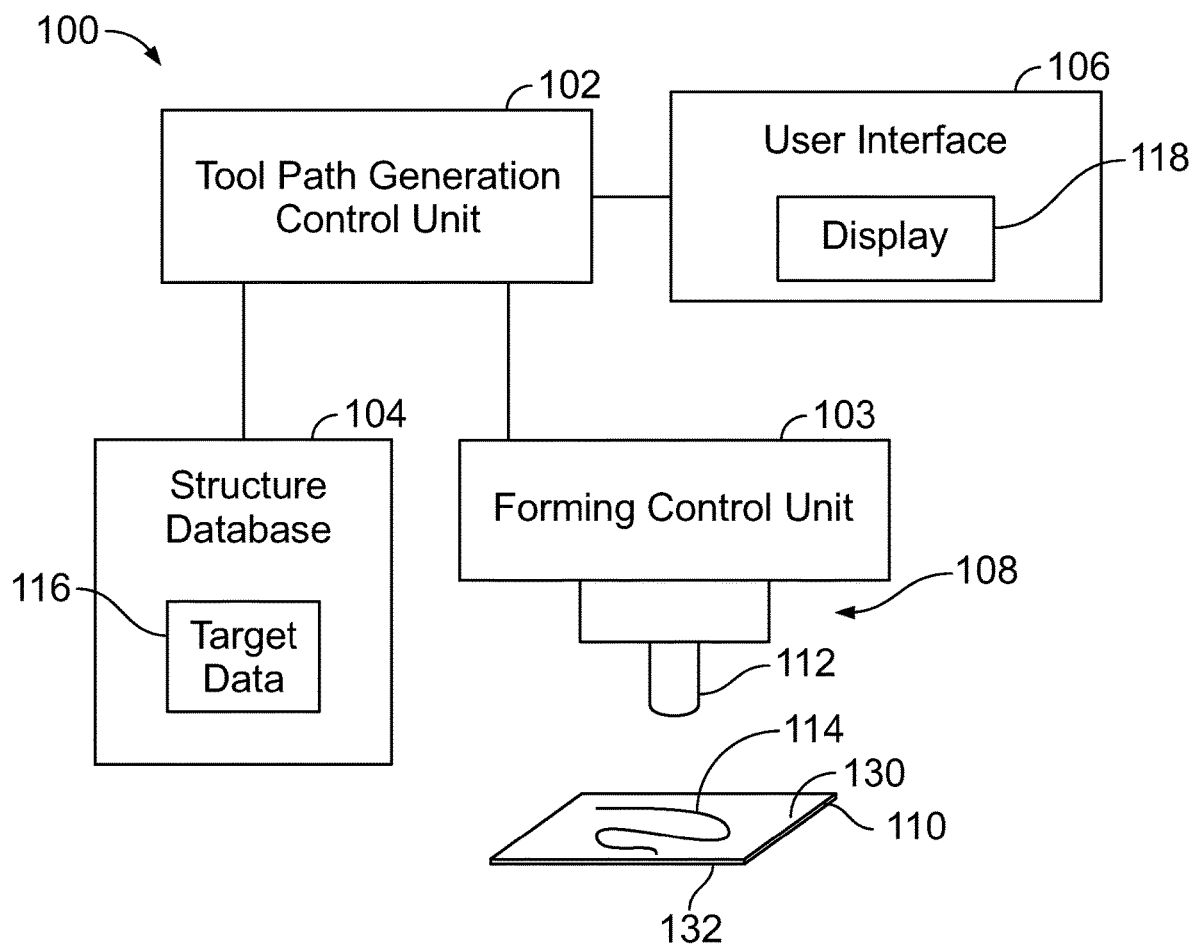
FIG. 4 illustrates a schematic block diagram of an incremental sheet forming system, according to an embodiment of the present disclosure.

FIG. 4 illustrates a schematic block diagram of an incremental sheet forming system 100, according to an embodiment of the present disclosure. In at least one embodiment, the incremental sheet forming system 100 includes a tool path generation control unit 102 in communication with a structure database 104, such as through one or more wired or wireless connections. The tool path generation control unit 102 may also be in communication with a user interface 106, such as through one or more wired or wireless connections. The tool path generation control unit 102 may be co-located with one or both of the structure database 104 and/or the user interface 106. Optionally, the tool path generation control unit 102 may be remotely located from one or both of the structure database 104 and/or the user interface 106. Within examples, the incremental sheet forming system 100 includes the boundary region cutting tool 120 illustrated in FIG. 3.

The incremental sheet forming system 100 also includes a forming tool 108 that is configured to operate on a workpiece 110 (such as a blank or sheet of metal having the boundary region 122) to form a structure. The forming tool 108 is controlled by a forming control unit 103. As an example, the tool path generation control unit 102 and the forming control unit 103 cooperate so that the forming control unit 103 forms a structure from the inner region 124 of workpiece 110. The tool path generation control unit 102 and the forming control unit 103 can be separate and distinct from one another, or part of a common control unit.

In at least one embodiment, the forming tool 108 is a forming stylus having a rounded, blunted operative end 112 that is configured to exert force onto the workpiece 110 to form various features therein and/or thereon (such as curves, bends, indentations, and/or the like). The forming tool 108 operates on the workpiece 110 according to a tool path 114 (for example, through a predetermined tool path having a starting point and an end point) to form a desired shape of the structure from the workpiece 110.

Figure 5A:
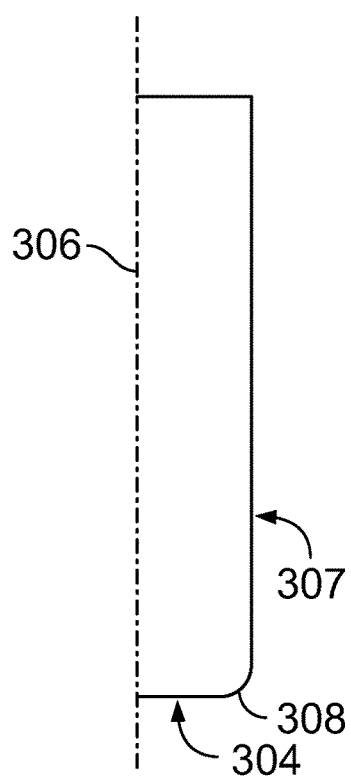
FIGS. 5A and 5B illustrate, respectively, a cross section and lateral view of a forming tool (stylus) with toroidal operative end, according to an embodiment of the present disclosure.
Figure 5B:
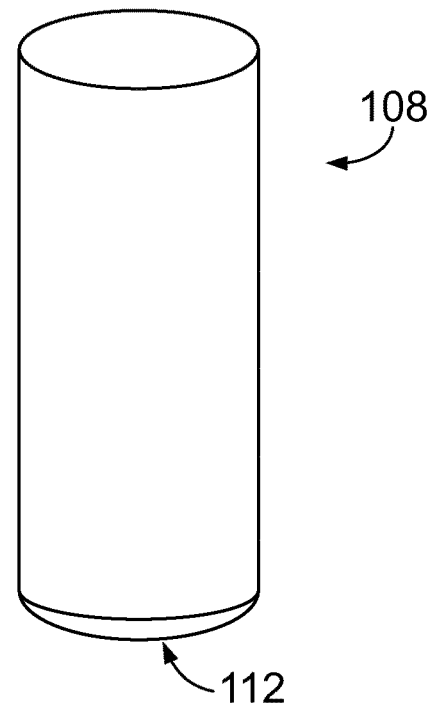
Figure 6A:
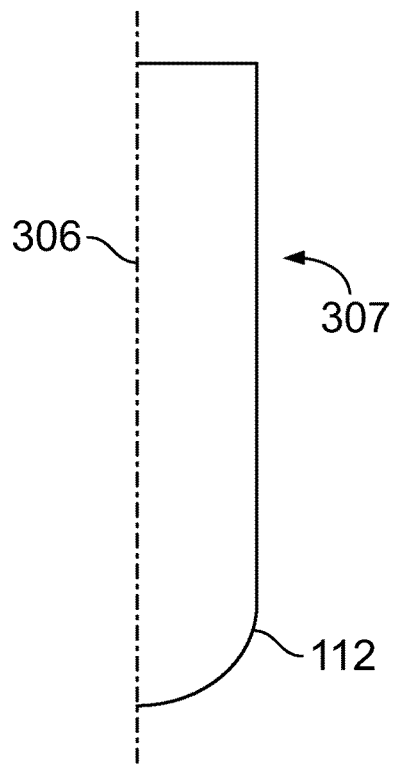
FIGS. 6A and 6B illustrate, respectively, a cross section and lateral view of forming tool (stylus) with hemispherical operative end, according to an embodiment of the present disclosure.
Figure 6B:
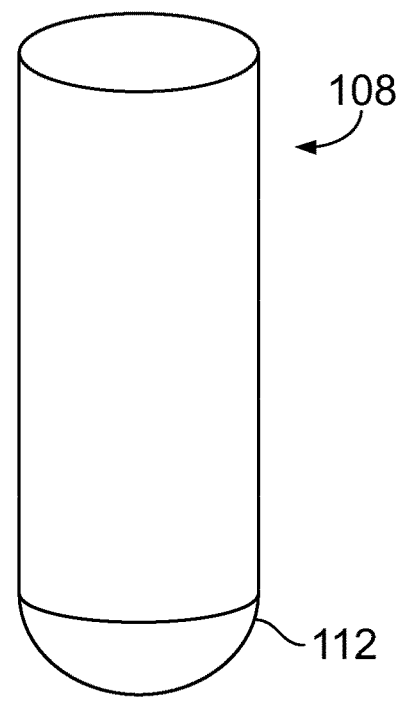

FIGS. 5A-B illustrate a forming tool 108 and an operative end 112, according to an embodiment of the present disclosure. In one or more embodiments, the operative end 112 is axisymmetric with respect to the centerline 306 and the profile of revolution 307 is smooth and convex. In at least one embodiment, the profile is a rectangle with a rounded (filleted) corner 308. In this manner, the forming tool 108 can be a bull nose or toroidal tool. In contrast to a hemispherical end, the blunted, flat end 304 is configured to keep non-targeted portions of the workpiece 110 out of the way during incremental sheet forming operations. Alternatively, the operative end 112 can be hemispherical, as shown in FIGS. 6A-B, or other shapes.

In at least one embodiment, the tool path generation control unit 102 is in communication with the forming tool 108, such as through one or more wired or wireless connections. The tool path generation control unit 102 is configured to operate the forming tool 108 to form the desired shape of a target structure, which is formed from the inner region 124 of workpiece 110 (an initial structure, such as sheet metal, for example).

Referring again to FIG. 4, the structure database 104 stores various data. For example, the structure database 104 stores target data 116. The target data 116 includes information regarding a target or desired inner region. For example, the target data 116 may include a discrete geometric definition, such as a tessellation, of a target inner region, which may include one or more inward features. Such may be, for example, in the format of an STL (e.g., stereolithography, "Standard Triangle Language", or "Standard Tessellation Language") file, a PLY (e.g., Polygon File Format or Stanford Triangle Format) file, or a VRML (e.g., Virtual Reality Modeling Language) file. Optionally, the target data 116 may include a collection of trimmed parametric surfaces, curves, and points. Such may be, for example, in the format of a STEP (e.g., "Standard for the Exchange of Product model data") file, a SAT (e.g., Standard ACIS Text and/or Standard ACIS Binary) file, a Parasolids file, or an IGES (e.g., Initial Graphics Exchange Specification) file.

The user interface 106 includes a display 118 and one or more interface devices, such as a monitor, television, touchscreen, a keyboard, a mouse, and/or the like. The user interface 106 and the tool path generation control unit 102 may be part of a computer workstation, for example. In at least one other embodiment, the tool path generation control unit 102 and the user interface 106 may be part of a handheld device, such as a smart tablet, smart phone, laptop computer, or the like.

In operation, the tool path generation control unit 102 processes target data 116 in order to generate a toolpath suitable for forming the target structure from the inner region of the workpiece. The target data 116 may include information regarding the size, shape, and features of the target structure, as noted above. In at least one embodiment, the target data 116 may include target structure geometry data and manufacturing process data.

Figure 7:
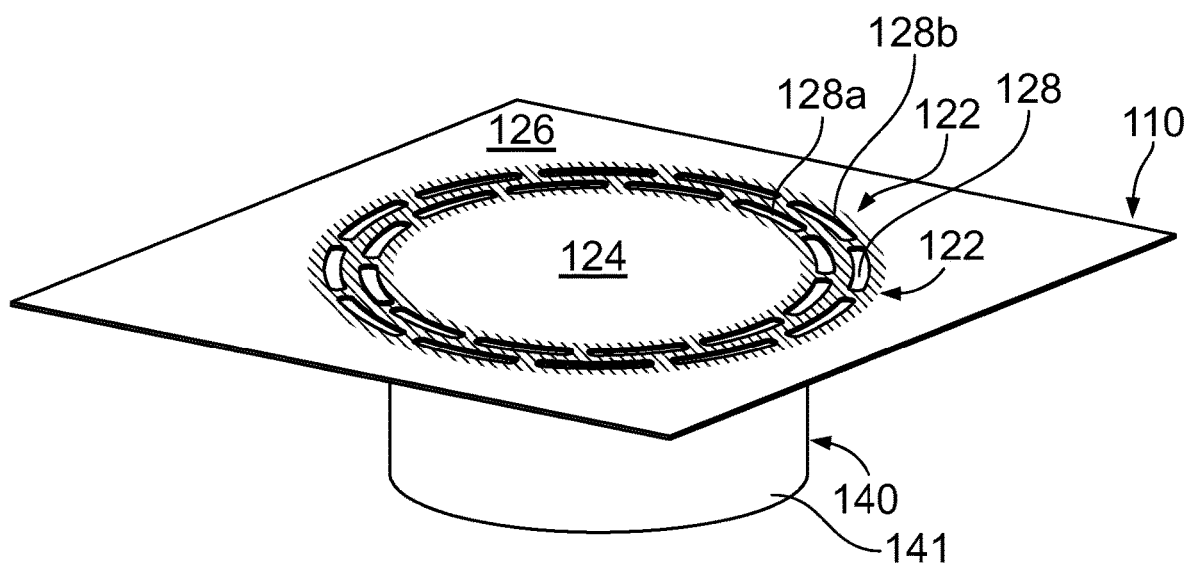
FIG. 7 illustrates an orthographic view of a workpiece containing staggered conformal slot openings, according to an embodiment of the present disclosure.

As described herein, before an incremental sheet forming operation that forms the structure, openings 128 are cut into the boundary region 122 (shown as hatched) of the workpiece 110. FIG. 2 shows a plan (top) view of once such embodiment where the inner region of workpiece 110 is to be formed into a cylindrical structure having a vertical wall. FIG. 7 illustrates the workpiece 110 positioned on die 140 having the same shape as the geometry to be formed. As shown in FIGS. 2 and 7, the boundary region 122 is positioned between an inner region 124 and an outer region 126. In at least one embodiment, the connectors 134 are a pattern of staggered conformal slot openings which conform to the perimeter of the base of the die 140 (have a shape which follows along the perimeter of the base of the die 140) and which connect the inner region 124 and the outer region 126. It has been found that this pattern of openings 128 and connectors 134 facilitates lateral movement of material (movement of material normal to the toolpath) during incremental sheet forming processes such that fracture in steep walls are avoided. Additionally, this configuration provides enough support to prevent inner region 124 from moving excessively across the die 140 under the action of forming tool 108.

As an example, the boundary region 122 includes a plurality of openings 128 formed as slots (that is, slot openings 128) openings that follow a shape of a die perimeter 141. Further, the openings 128 can be staggered with respect to successive nested layers 128*a*, 128*b* of the openings 128.

Figure 8:
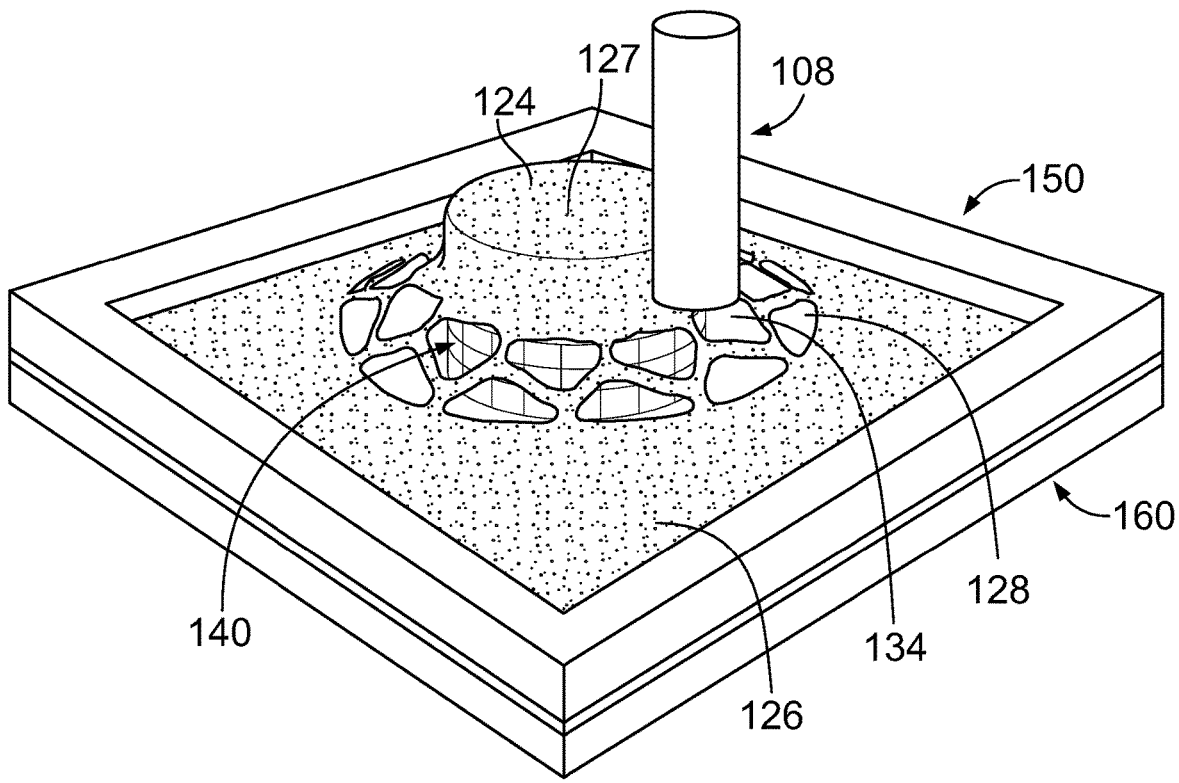
FIG. 8 illustrates a perspective view showing the incremental sheet forming process on a workpiece containing staggered conformal slot openings, according to an embodiment of the present disclosure.

Following placement of the workpiece 110 onto the die 140, the workpiece is clamped on one or more of its edges, such as with clamps 150 and 160 as shown in FIG. 8. The forming control unit 103 then operates the forming tool 108 in relation to the workpiece 110 (such as a blank piece of metal) over the tool path 114 according to the target data 116 to form the structure from the inner region 124 of workpiece 110. FIG. 8 is an illustration depicting an intermediate stage through this forming process. During this process, clamps 150 and 160 have a downwards acting force applied in order to keep much of workpiece 110 clear of the forming tool 108. After the structure 127 is formed, the outer region 126 and the boundary region 122 are trimmed from the structure 127.

Figure 9:
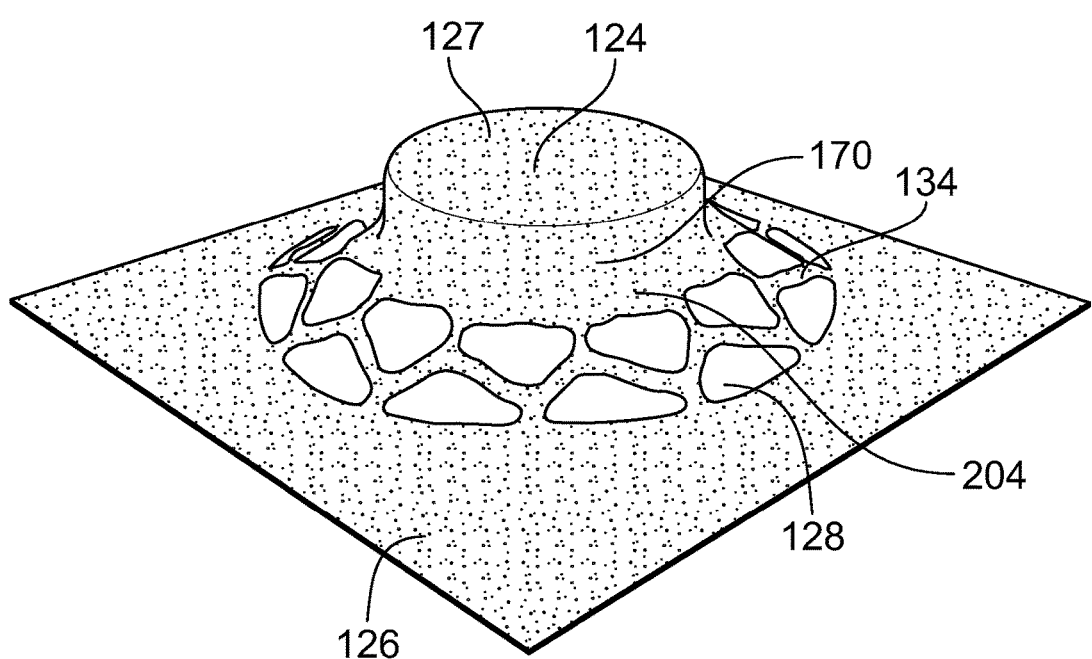
FIG. 9 illustrates a perspective view of a cylinder structure formed through incremental sheet forming using a workpiece containing staggered conformal slot openings, according to an embodiment of the present disclosure.
Figure 10:
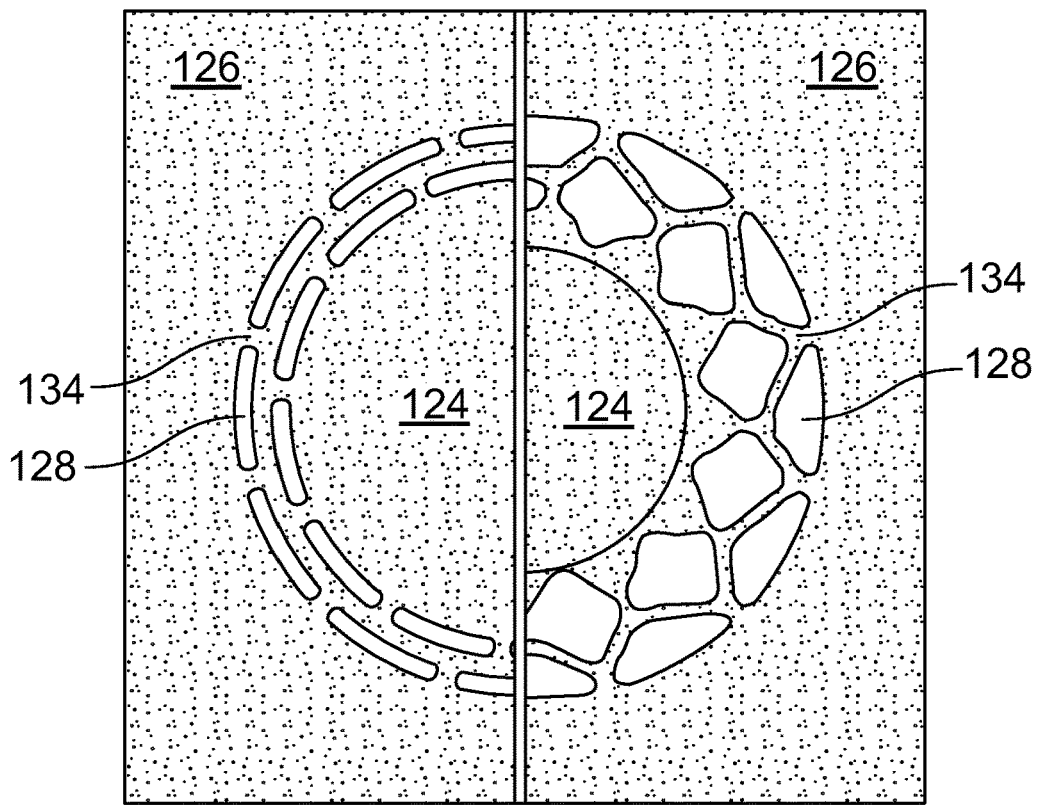
FIG. 10 illustrates a top view of an unformed workpiece with staggered conformal slot openings (left half) and the result of forming that workpiece into a cylinder through incremental sheet forming (right half), according to an embodiment of the present disclosure.

FIG. 9 shows the formed structure prior to trimming. Vertical walls 170 have been formed without tearing because connectors 134 in the boundary region 122 have lengthened through plastic strain thereby allowing the outermost regions of the inner region 124 to draw in towards the walls of the die 140. FIG. 10 shows a comparison of the workpiece 110 before and after forming. The left half of this figure contains a plan (top) view of the workpiece before forming. The right half of this figure shows a plan view of the workpiece after forming has completed, but prior to trimming. More particularly, the left half of FIG. 10 illustrates a first half of workpiece 110 at a first time before forming (e.g., as shown in FIG. 7), and the right half of FIG. 10 illustrates a second half of workpiece 110 at a second time after forming (e.g., as shown in FIG. 9). Connectors 134 (such as ligaments) have lengthened, and have changed their angle with respect to one another. Openings 128 have changed shape accordingly. This combination has allowed the outermost regions of inner region 124 to draw in towards the vertical walls of die 140. In doing so the vertical walls have more material available underneath forming tool 108 and have not fractured, as would be the case if openings 128 were not cut into the workpiece 110.

Figure 11:
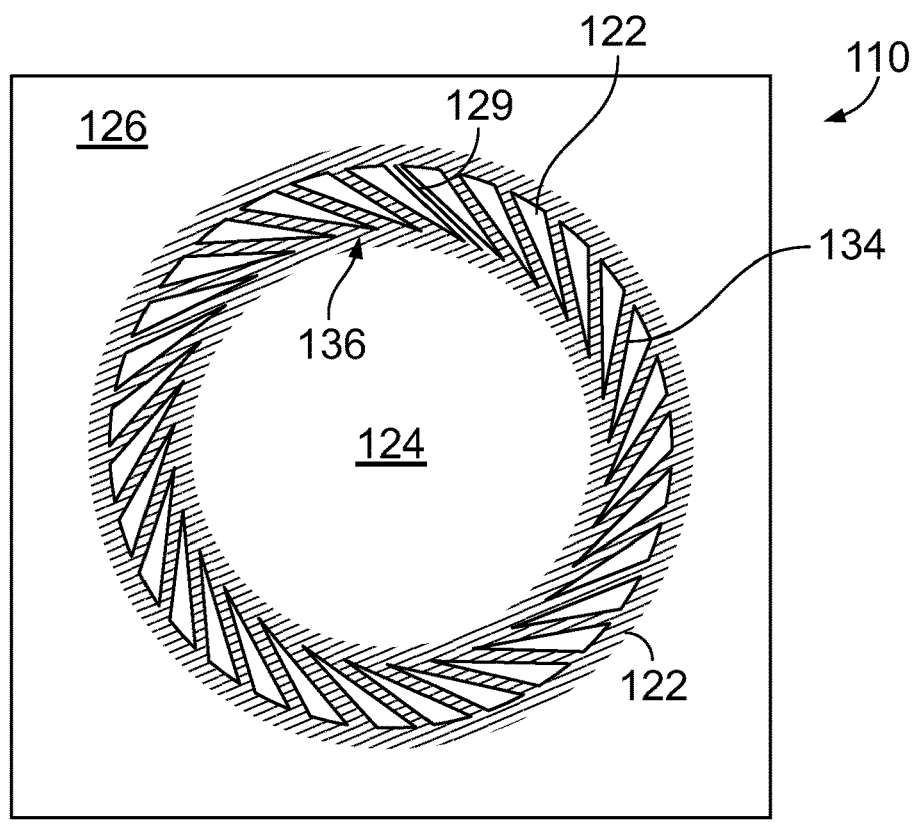
FIG. 11 illustrates a top view of a workpiece containing linear connectors, according to an embodiment of the present disclosure.
Figure 12:
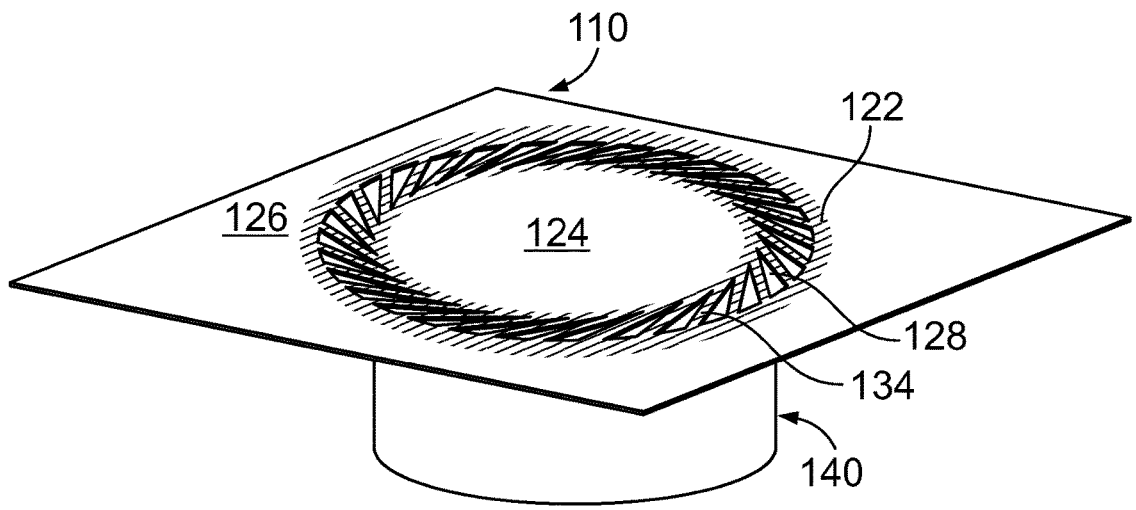
FIG. 12 illustrates an orthographic view of a workpiece containing linear connectors, according to an embodiment of the present disclosure.

FIG. 11 illustrates a plan (top) view of an alternative embodiment which depicts a different workpiece 110 containing a different boundary region 122 that is used to form inner region of workpiece 110 into a structure with the same cylinder geometry having vertical walls. FIG. 12 illustrates the workpiece 110 positioned on die 140 having the same shape as the geometry to be formed. In at least one embodiment, the connectors 134 are straight ligaments with centerlines 129 which connect the inner region 124 and the outer region 126. In at least one embodiment, the centerlines 129 are tangent (or aligned toward the tangent, such as within plus or minus 3 degrees) to edge 136 of the inner region 124. It has been found that this pattern of openings 128, where the ligaments are aligned in this way, allows for draw in of material during incremental sheet forming processes such that fracture is avoided in steep walls. Additionally, this configuration provides enough support to prevent inner region 124 from moving excessively across the die under the action of forming tool 108. Optionally, the connectors 134 can include curved segments, and/or may have centerlines 129 that are not aligned toward the tangent in relation to the edge 136.

Figure 13:
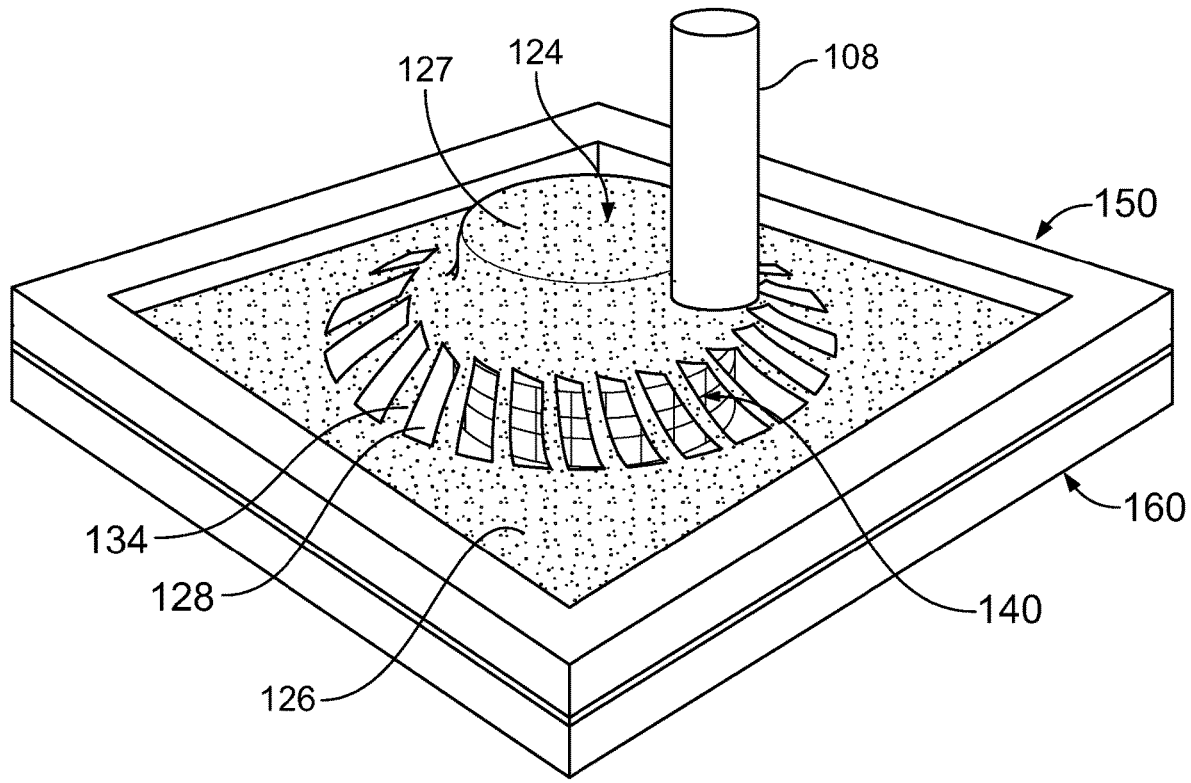
FIG. 13 illustrates a perspective view showing the incremental sheet forming process on a workpiece containing linear connectors, according to an embodiment of the present disclosure.

Following placement of the workpiece 110 onto the die 140, the workpiece is clamped on one or more of its edges, such as with clamps 150 and 160 as shown in FIG. 13. The forming control unit 103 operates the forming tool 108 in relation to the workpiece 110 (such as a blank piece of metal) over the tool path 114 according to the target data 116 to form the structure from the inner region 124 of workpiece 110. FIG. 13 is an illustration depicting an intermediate stage through this forming process. During this process, clamps 150 and 150 have a downwards acting force applied in order to keep much of workpiece 110 clear of the forming tool 108. After the structure 127 is formed, the outer region 126 and the boundary region 122 are trimmed from the structure 127.

Figure 14:
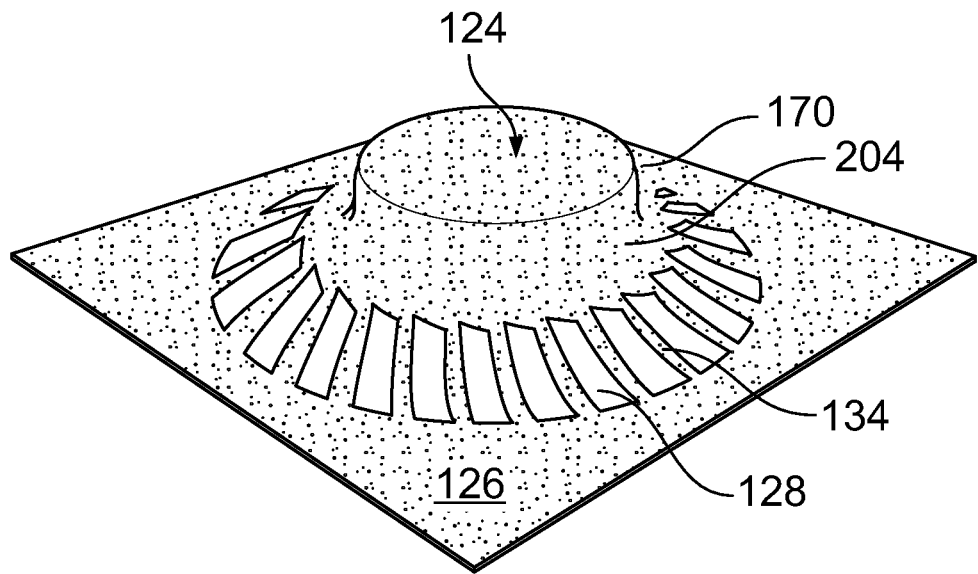
FIG. 14 illustrates a perspective view of a cylinder structure formed through incremental sheet forming using a workpiece containing linear connectors, according to an embodiment of the present disclosure.
Figure 15:
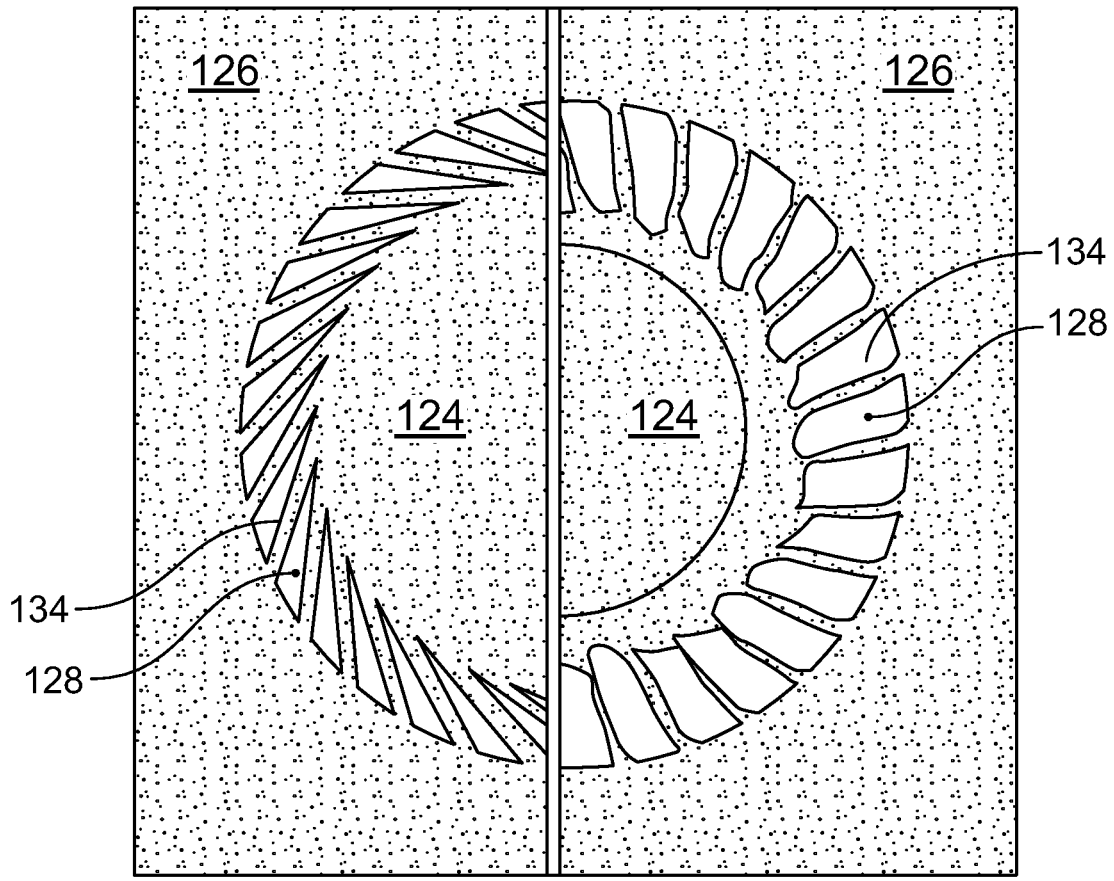
FIG. 15 illustrates a top view of an unformed workpiece with linear connectors (left half) and the result of forming that workpiece into a cylinder through incremental sheet forming (right half), according to an embodiment of the present disclosure.

FIG. 14 illustrates the formed structure prior to trimming and, FIG. 15 shows a plan (top) view which compares workpiece 110 before and after forming. The left half of this figure contains a plan view of the workpiece before forming. The right half of this figure shows a plan view of the workpiece after forming has completed, but prior to trimming. More particularly, the left half of FIG. 14 illustrates a first half of workpiece 110 at a first time before forming, and the right half of FIG. 14 illustrates a second half of workpiece 110 at a second time after forming. Referring now to FIGS. 14 and 15, vertical walls 170 have been formed without tearing because connectors 134 in the boundary region 122 have lengthened through plastic strain and the angle of centerlines 129 with respect to the edge 136 of the inner region 124 has increased. In other words, the ligaments which make up connectors 134 have changed from being tangent (or close to tangent) to being closer to normal to edge 136. The combination of these effects allows the outermost regions of the inner region 124 to draw in towards the walls of the die 140. In doing so, the steep walls have more material available underneath forming tool 108 and have not fractured, as would be the case if openings 128 were not cut into the workpiece 110.

Figure 16:
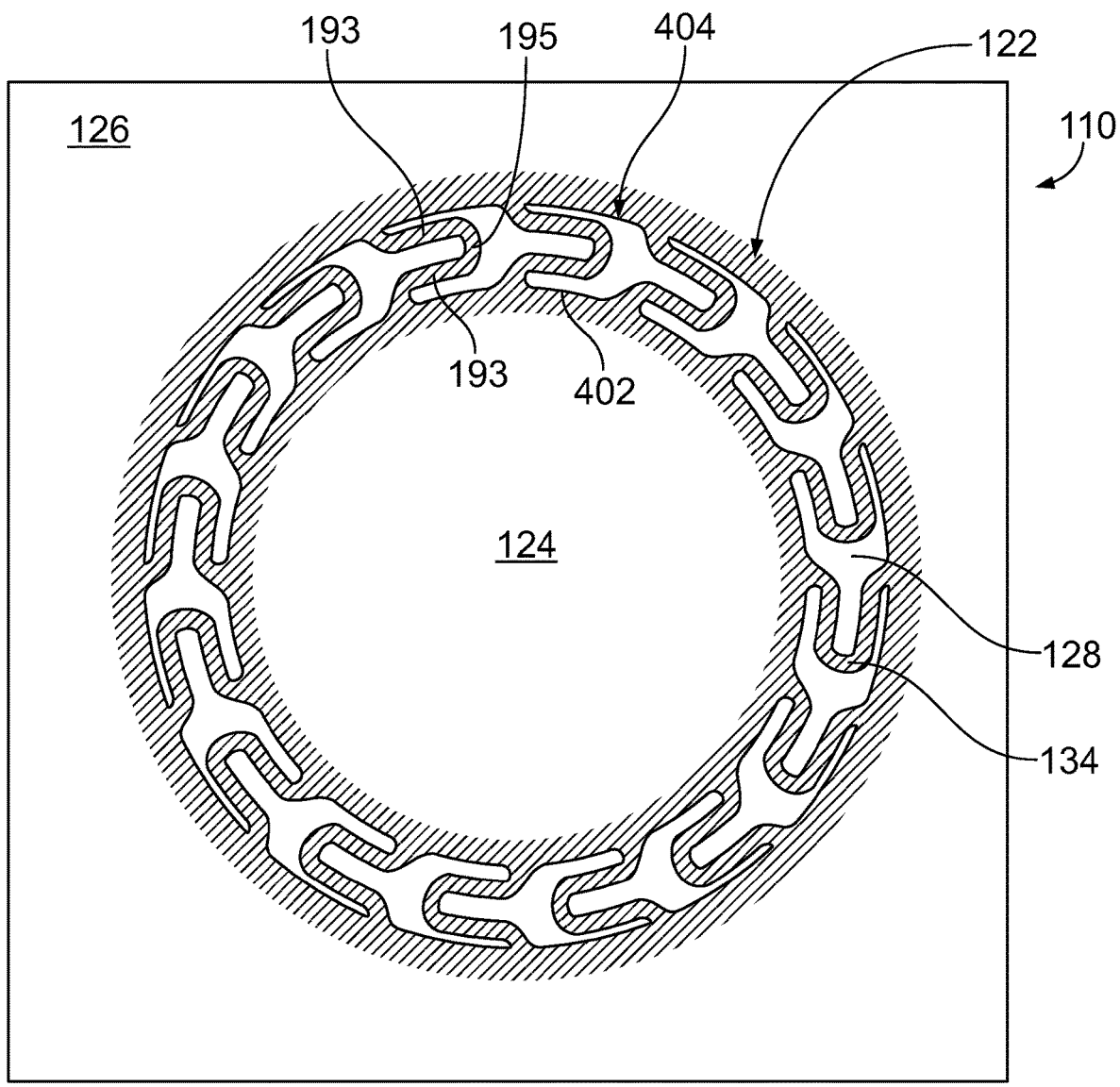
FIG. 16 illustrates a top view of a workpiece containing u-shaped connectors, according to an embodiment of the present disclosure.

FIG. 16 illustrates a plan (top) view of a workpiece 110, according to a further embodiment of the present disclosure which is designed for forming over a cylinder die with vertical walls. In this embodiment, the boundary region 122 includes a plurality of curved connectors 134 connecting the inner boundary region curve 402 to the outer boundary region curve 404 of the workpiece 110. For example, the curved connectors 134 include two linear portions 193 connected to a curved portion 195, in which the linear portions 193 can be approximately parallel to one another. When the forming tool 108 passes close to the inner boundary region curve 402, the U-shaped connectors can splay outwards thereby allowing them to lengthen. This lengthening of the connectors allows unformed material in the inner region to draw in towards the die with relatively little resistance. This draw in allows the material under forming tool 108 to thin less than would be possible without the plurality of openings 128 cut into workpiece 110. In at least one embodiment, one or both of the inner boundary region curve 402 and/or the outer boundary region curve 404 maintain a fixed offset distance from a perimeter of a die (for example, the die 140 shown in FIG. 7) in a plane of the workpiece 110.

Figure 17:
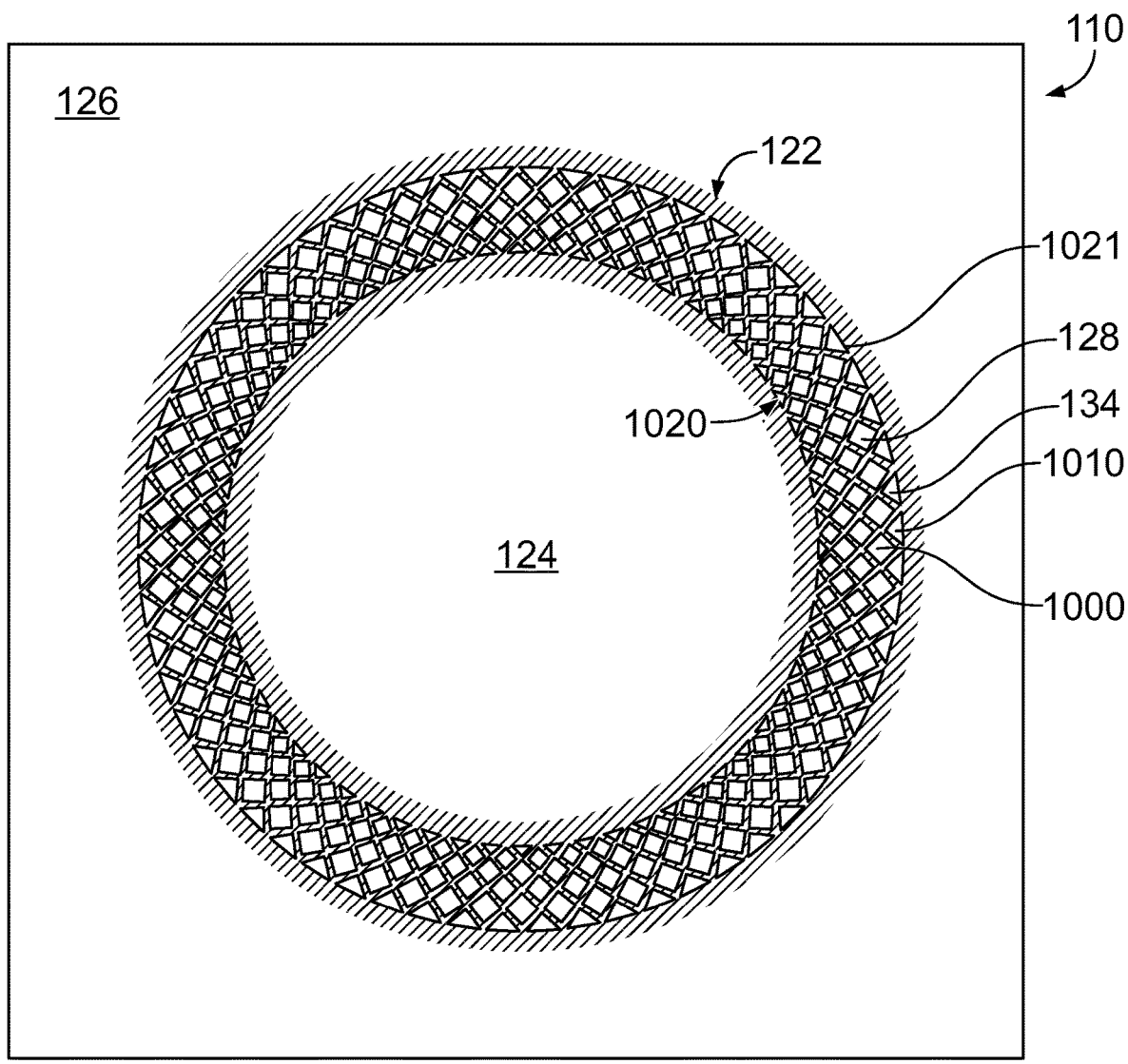
FIG. 17 illustrates a top view of a workpiece containing spoke connectors, according to an embodiment of the present disclosure.

FIG. 17 illustrates a plan (top) view of a further embodiment for forming over a cylinder die with vertical walls. In this embodiment, the boundary region 122 includes a pattern of openings 128 between connectors 134 that include spoke segments 1000 and 1010 that connect with each other, and also to an inner rim 1020 and an outer rim 1021. As forming tool 108 passes nearby these spokes, the angle between the spokes becomes less thereby providing extension in the radial direction with respect to the cylinder shape of die 140. This lengthening of the connectors allows unformed material in the inner region to draw in towards the vertical walls of the die with less resistance. This draw in allows the material under forming tool 108 to thin less than would be possible without the plurality of openings 128 cut into workpiece 110. In at least one embodiment, the connectors (such as the plurality of connecting elements) include ligaments connected to the inner rim 1020 and the outer rim 1021, and are arranged in a pattern of spokes. As shown in FIG. 17, each of the connecting elements (that is, the connectors 134) may intersect at least one other of the plurality of connecting elements.

Figure 18:
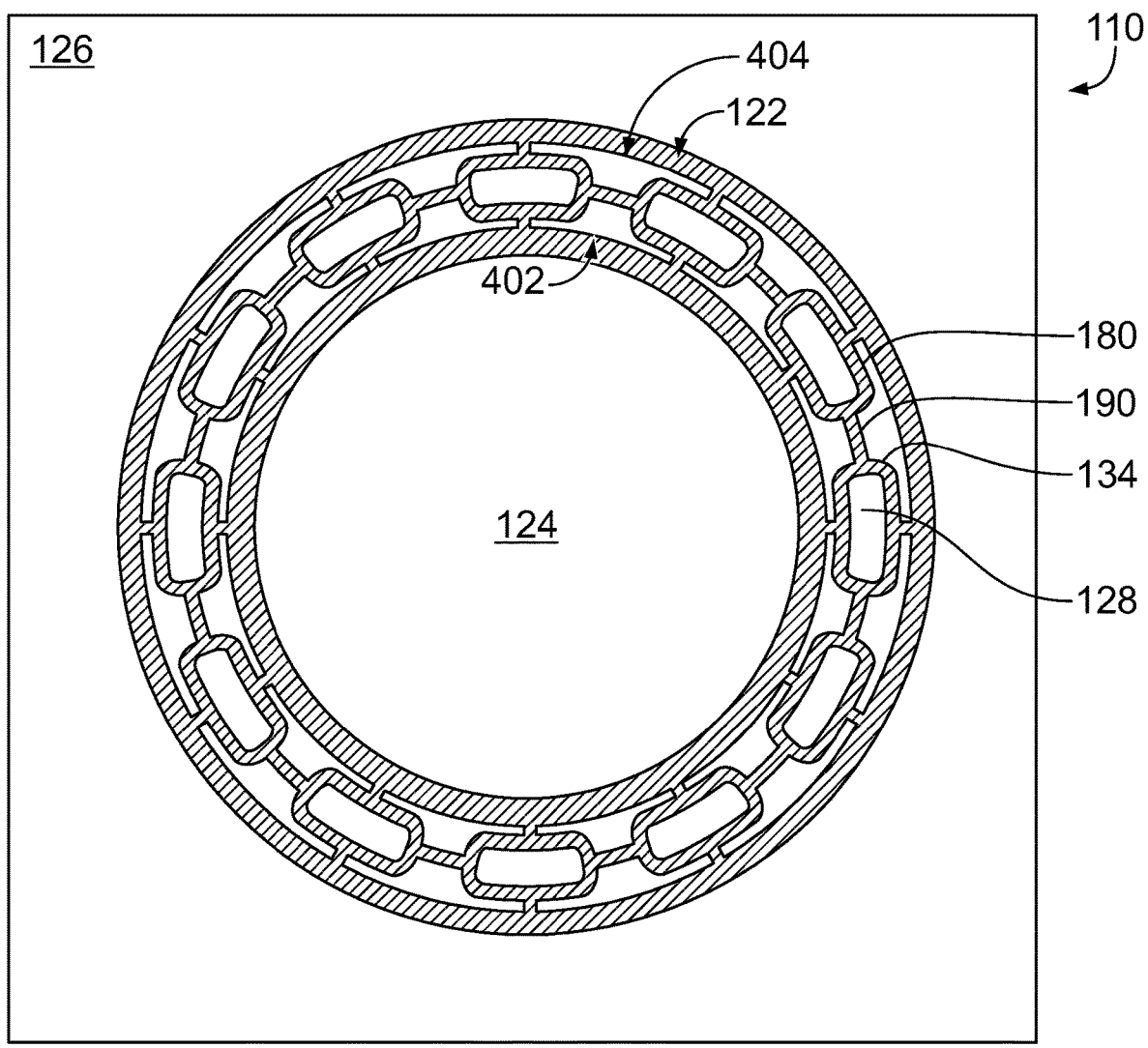
FIG. 18 illustrates a top view of a workpiece containing linked ring shaped connectors, according to an embodiment of the present disclosure.

FIG. 18 illustrates a plan (top) view of a workpiece 110, according to a further embodiment of the present disclosure which is designed for forming over a cylinder die with vertical walls. In this embodiment, the boundary region 122 includes a plurality of linked ovular ring shaped connectors 134, each including a ring of metal 180 and connected together by links 190. The connectors 134 span the inner boundary region curve 402 to the outer boundary region curve 404 of the workpiece 110. When the forming tool 108 passes close to the inner boundary region curve 402, the linked ring shaped connectors can elongate in a radial direction with respect to the die 140, thereby allowing them to lengthen in a fashion which is controlled by the stiffness of the linkages. This controlled lengthening of the connectors allows unformed material in the inner region to draw in towards the die which allows for less material thinning under the tool.

In at least one embodiment, the workpiece 110 is a metal sheet, and the boundary region 122, including the pattern of openings 128, constitutes a perforated metal sheet. In at least one embodiment, each of the openings 128 is a unit cell opening having a specific shape. The shape of the openings 128 may repeat over the entirety of the pattern. The openings 128 may be the same size and shape. Optionally, at least some of the openings 128 may differ in size and/or shape.

Figure 19:
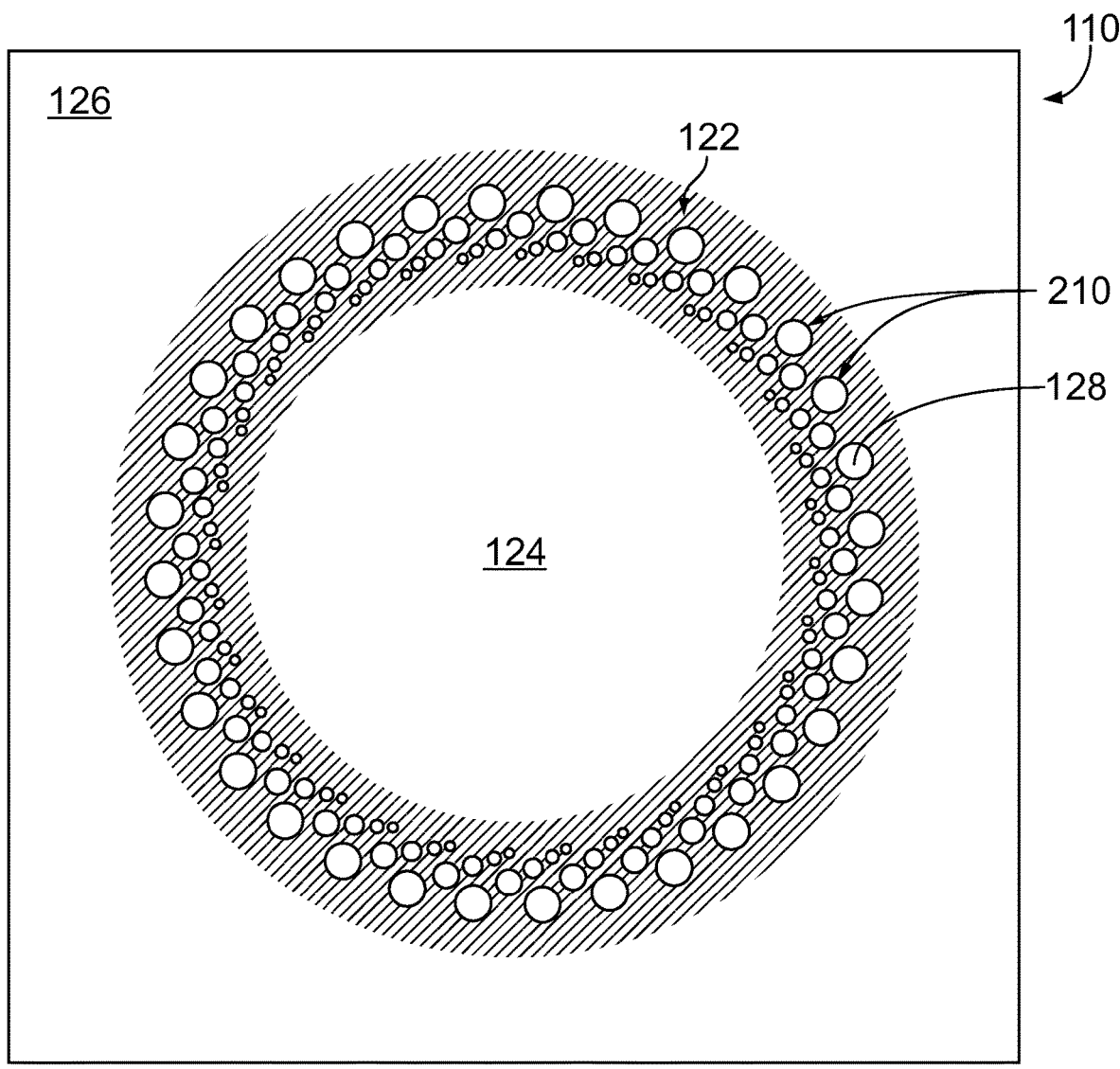
FIG. 19 illustrates a top view of a workpiece containing a pattern of circular hole openings, according to an embodiment of the present disclosure.

FIG. 19 illustrates a plan (top) view one such embodiment containing holes 210 drilled into boundary region 122 which form openings 128 in workpiece 110. This embodiment is designed for forming over a cylinder die with vertical walls.

Figure 20:
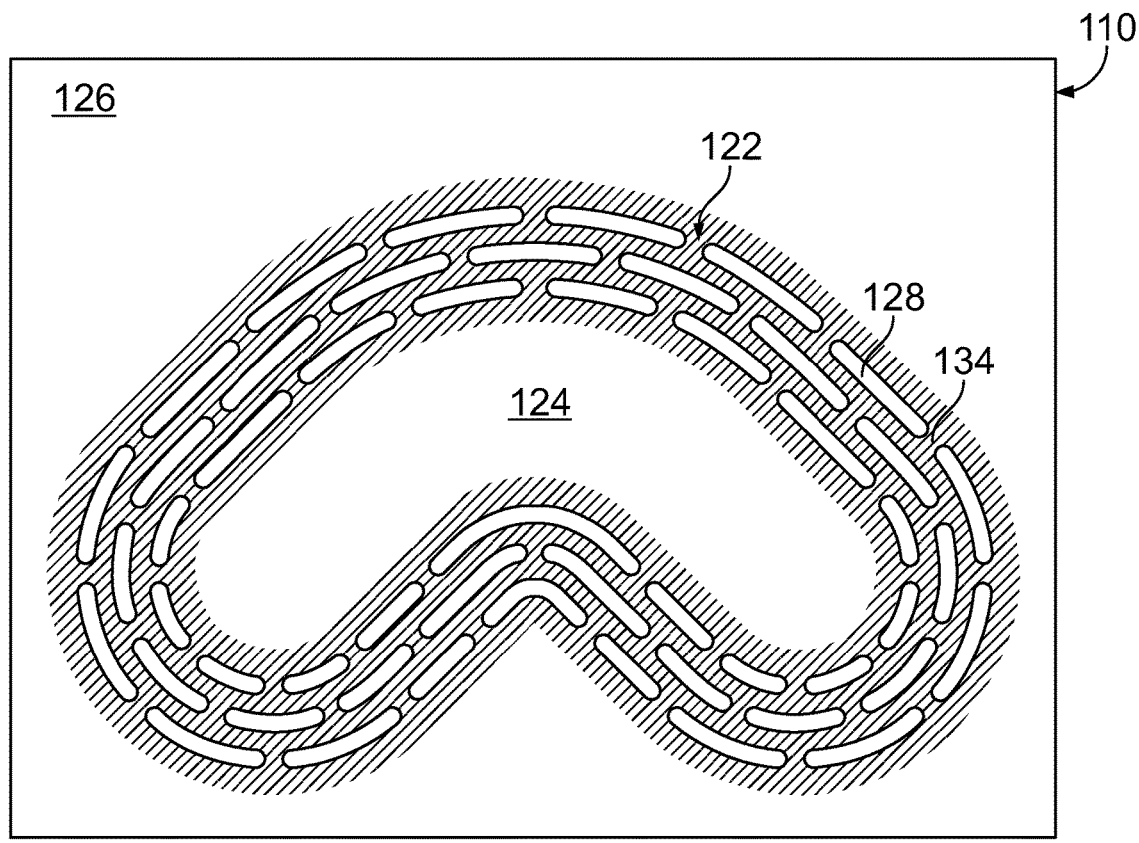
FIG. 20 illustrates a top view of a workpiece containing staggered conformal slot openings, according to an embodiment of the present disclosure.
Figure 21:
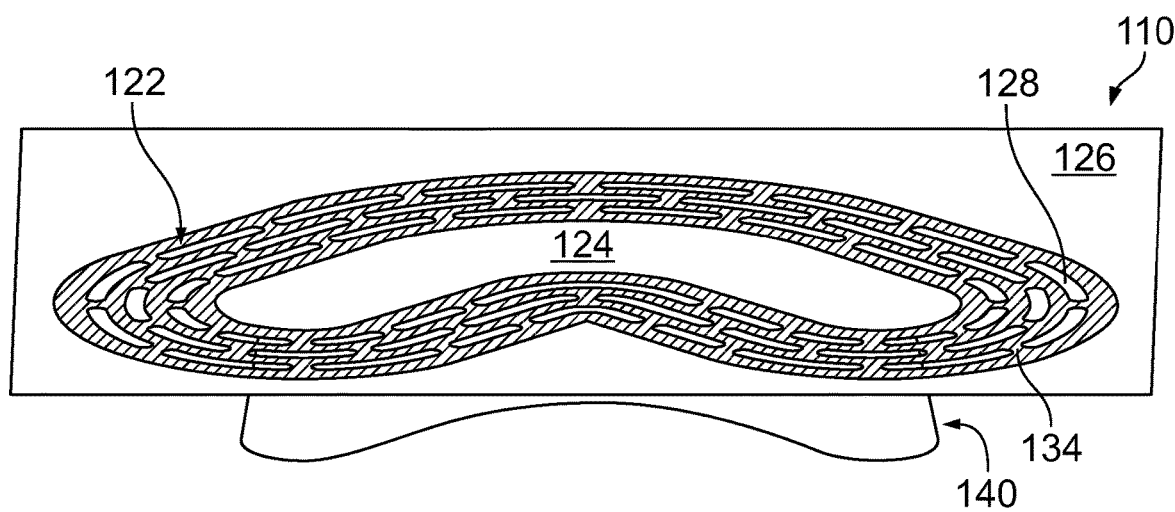
FIG. 21 illustrates an orthographic view of a workpiece containing staggered conformal slot openings, according to an embodiment of the present disclosure.
Figure 23:
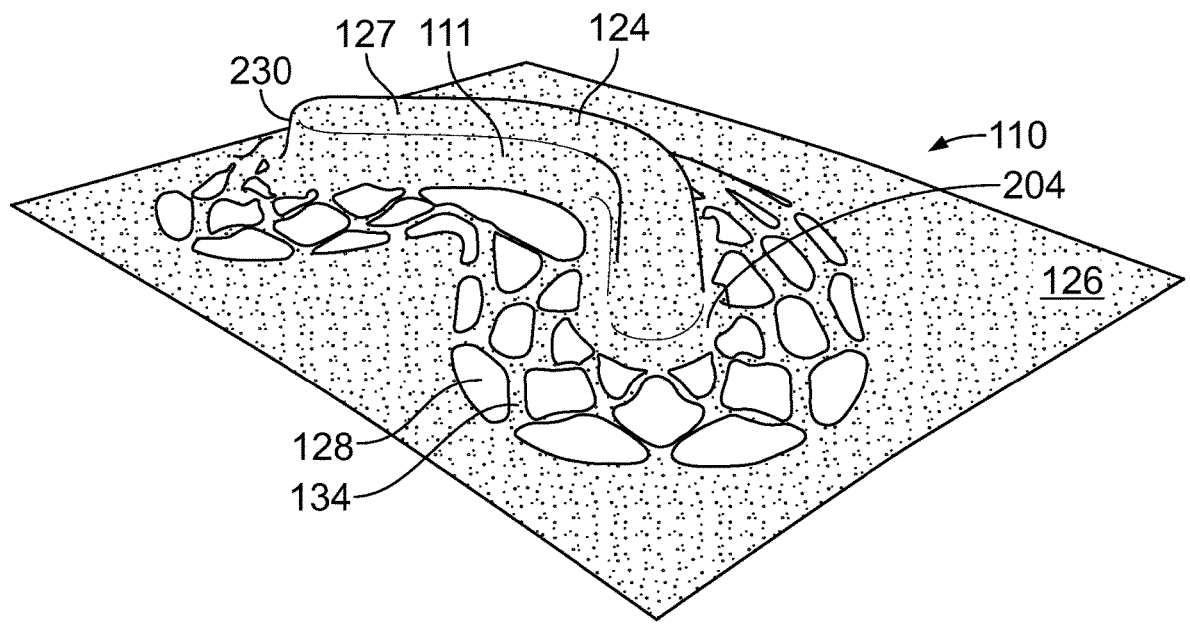
FIG. 23 illustrates a perspective view of an L-shaped structure formed through incremental sheet forming using a workpiece containing staggered conformal slot openings, according to an embodiment of the present disclosure.

FIG. 20 illustrates a plan (top) view of an alternative embodiment which depicts a different workpiece 110 containing a different boundary region 122 that is used to form inner region of workpiece 110 into a curved L-shaped structure having geometry with steep walls 111 (shown in FIG. 23, for example). In the illustrated example of FIG. 20, the steep walls are 80° walls. FIG. 21 illustrates the workpiece 110 positioned on die 140 having the same shape as the geometry to be formed. In this embodiment, the boundary region pattern comprises a pattern of staggered conformal openings which conform to the perimeter of the base of die 140, and the connectors 134 of the boundary region pattern connect the inner region 124 and the outer region 126. It has been found that this pattern of openings 128 deform in a way which allows for draw in of material during incremental sheet forming processes such that fracture is avoided in steep walls. Additionally, this configuration provides enough support to prevent inner region 124 from moving excessively across the die 140 under the action of forming tool 108.

Figure 22:
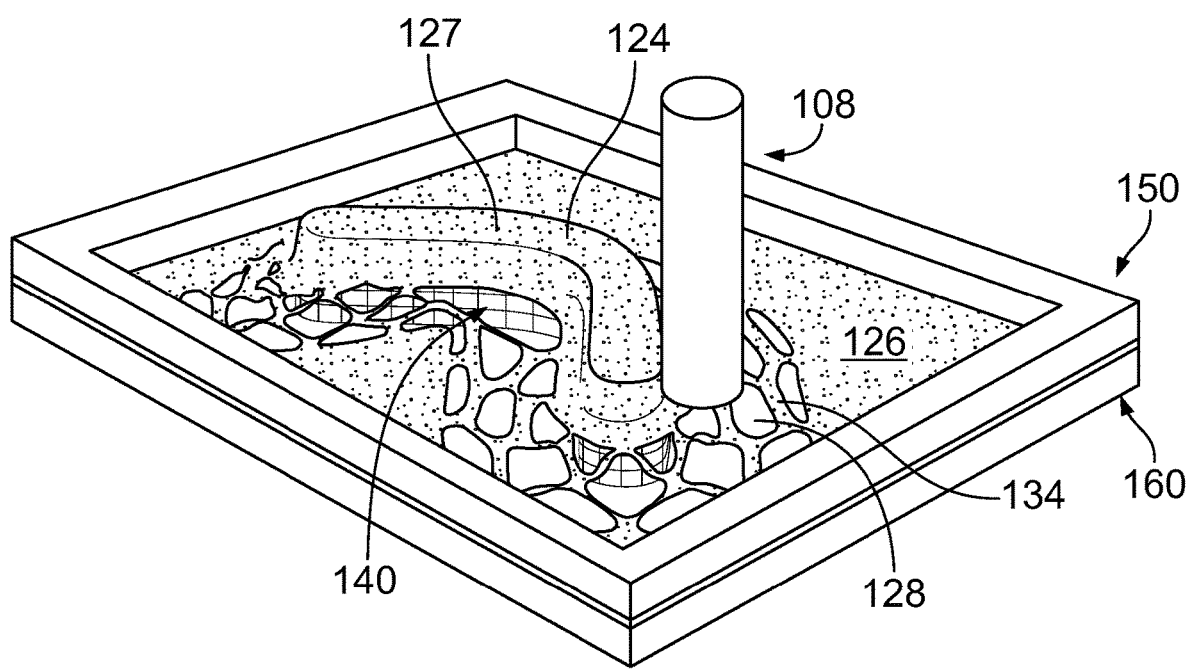
FIG. 22 illustrates a perspective view showing the incremental sheet forming process on a workpiece containing staggered conformal slot openings, according to an embodiment of the present disclosure.

Following placement of the die, the sheet is clamped on one or more of its edges, such as with clamps 150 and 160 as shown in FIG. 22. The forming control unit 103 operates the forming tool 108 in relation to the workpiece 110 (such as a blank piece of metal) over the tool path 114 according to the target data 116 to form the structure from the inner region 124 of workpiece 110. FIG. 22 is an illustration depicting an intermediate stage through this forming process. During this process clamps 150 and 160 have a downwards acting force applied in order to keep much of workpiece 110 clear of the forming tool 108. After the structure 127 is formed, the outer region 126 and the boundary region 122 are trimmed from the structure 127.

Figure 24:
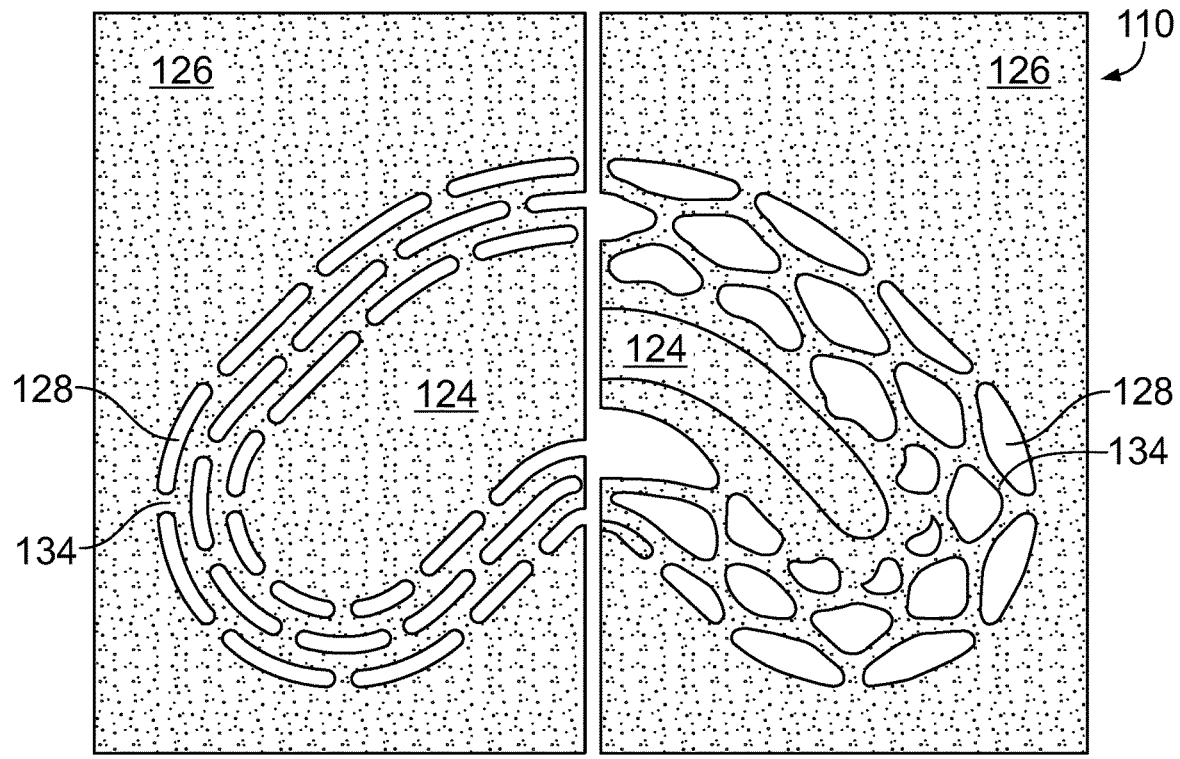
FIG. 24 illustrates a top view of an unformed workpiece with staggered conformal slot openings (left half) and the result of forming that workpiece into a L-shaped curve through incremental sheet forming (right half), according to an embodiment of the present disclosure.

FIG. 23 illustrates the formed structure prior to trimming, and FIG. 24 shows a plan view which compares workpiece 110 before and after forming. The left half of this figure contains a plan view of the workpiece before forming. The right half of this figure shows a plan view of the workpiece after forming has completed, but prior to trimming. More particularly, the left half of FIG. 23 illustrates a first half of workpiece 110 at a first time before forming, and the right half of FIG. 23 illustrates a second half of workpiece 110 at a second time after forming. Referring now to these figures, the 80° walls 110 have been formed without tearing because connectors 134 have lengthened and individual ligaments have changed their angle with respect to one another. Openings 128 have changed shape accordingly. This combination has allowed the outermost regions of inner region 124 to draw in towards the 80° walls 111 of the die 140. In doing so the steep walls have more material available underneath forming tool 108 and have not fractured, as would be the case if openings 128 were not cut into the workpiece 110.

Figure 25:
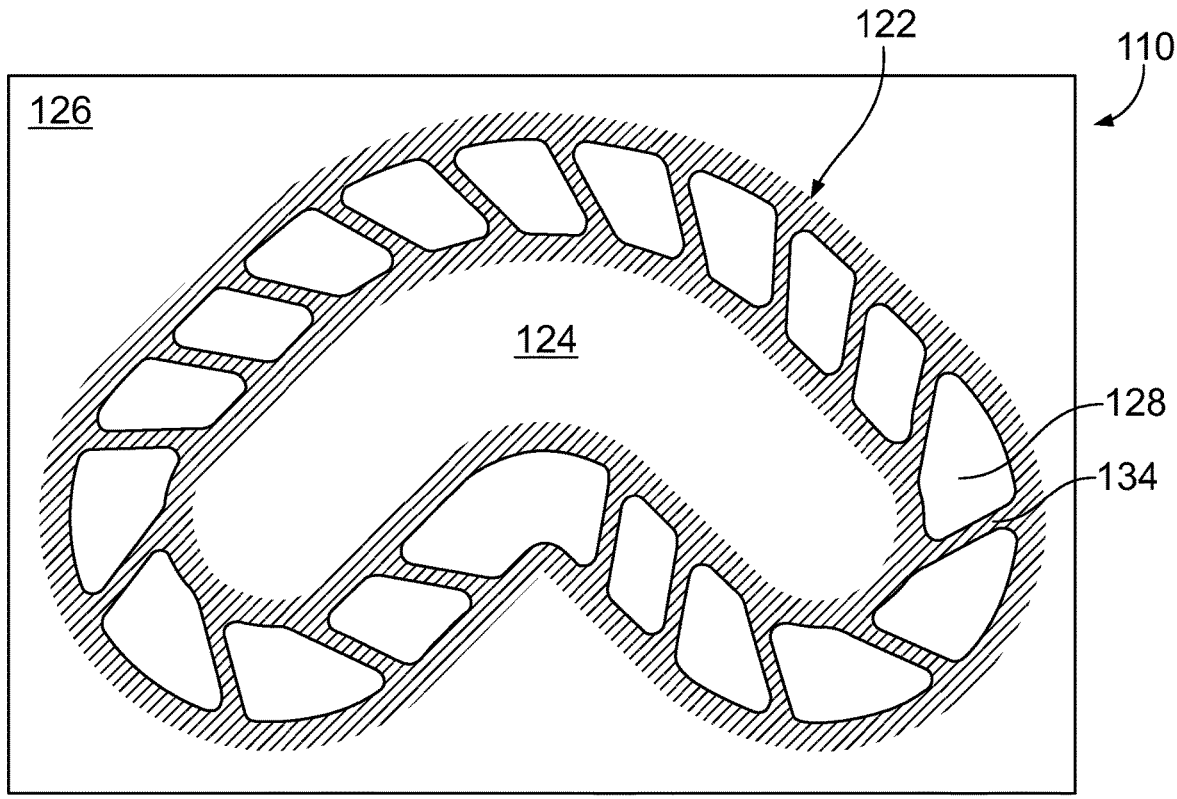
FIG. 25 illustrates a top view of a workpiece containing linear connectors, according to an embodiment of the present disclosure.
Figure 26:
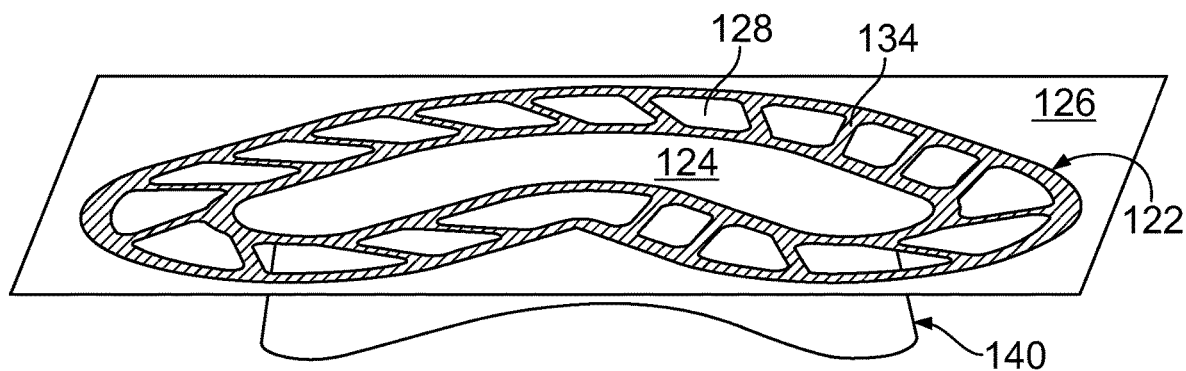
FIG. 26 illustrates an orthographic view of a workpiece containing linear connectors, according to an embodiment of the present disclosure.

FIG. 25 illustrates a plan (top) view of an alternative embodiment which depicts a different workpiece 110 containing a different boundary region 122 that is used to form inner region of workpiece 110 into a curved L-shaped structure having geometry with steep (80°) walls 111. FIG. 26 illustrates the workpiece 110 positioned on die 140 having the same shape as the geometry to be formed. In this embodiment the connectors 134 are straight ligaments which connect the inner region 124 and the outer region 126. It has been found that this pattern of openings 128, where the ligaments are aligned in this way, allows for draw in of material during incremental sheet forming processes such that fracture is avoided in steep walls. Additionally, this configuration provides enough support to prevent inner region 124 from moving excessively across the die under the action of forming tool.

Figure 27:
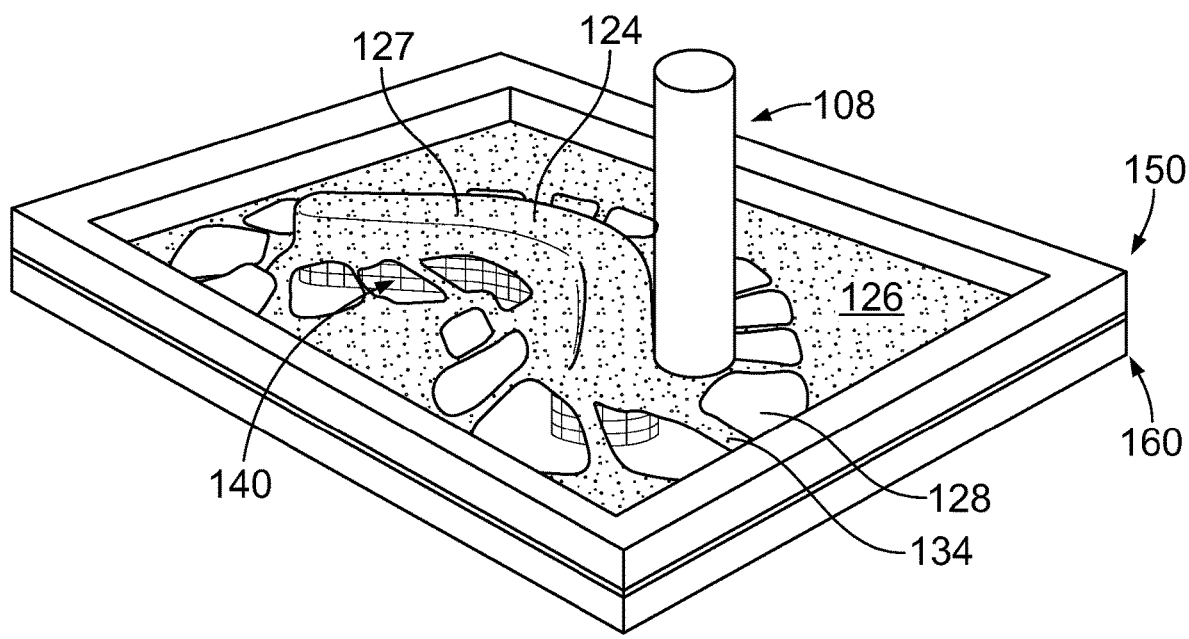
FIG. 27 illustrates a perspective view showing the incremental sheet forming process on a workpiece containing linear connectors, according to an embodiment of the present disclosure.

Following placement of the die, the sheet is clamped on one or more of its edges, such as with clamps 150 and 160 as shown in FIG. 27. The forming control unit 103 operates the forming tool 108 in relation to the workpiece 110 over the tool path 114 according to the target data 116 to form the structure from the inner region 124 of workpiece 110. FIG. 27 is an illustration depicting an intermediate stage through this forming process. During this process clamps 150 and 160 have a downwards acting force applied in order to keep much of workpiece 110 clear of the forming tool 108. After the structure 127 is formed, the outer region 126 and the boundary region 122 are trimmed from the structure 127.

Figure 28:
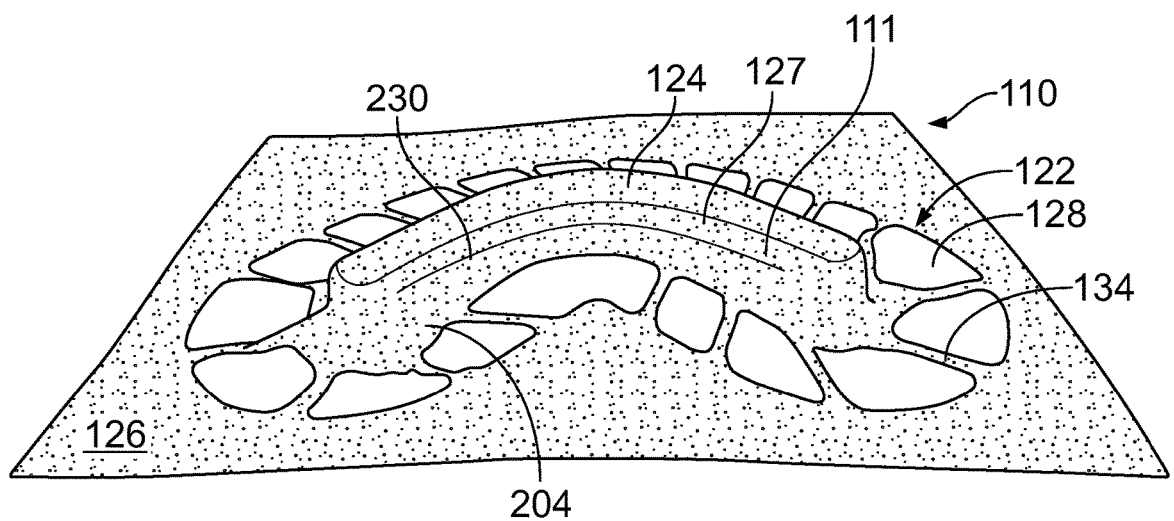
FIG. 28 illustrates a perspective view of an L-shaped structure formed through incremental sheet forming using a workpiece containing linear connectors, according to an embodiment of the present disclosure.
Figure 29:
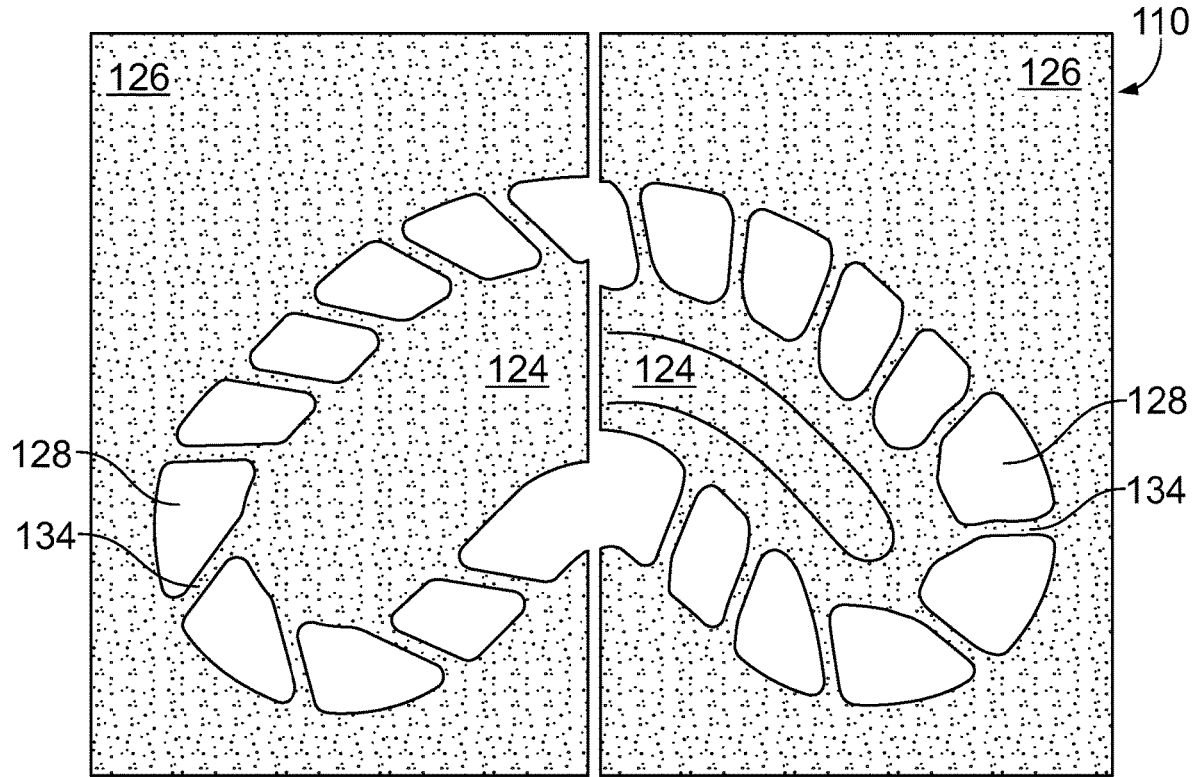
FIG. 29 illustrates a top view of an unformed workpiece with linear connectors (left half) and the result of forming that workpiece into a L-shaped curve through incremental sheet forming (right half), according to an embodiment of the present disclosure.

FIG. 28 illustrates the formed structure prior to trimming and FIG. 29 shows a plan view which compares workpiece 110 before and after forming. The left half of FIG. 29 contains a plan view of the workpiece before forming. The right half of this figure shows a plan view of the workpiece after forming has completed, but prior to trimming. More particularly, the left half of FIG. 29 illustrates a first half of workpiece 110 at a first time before forming, and the right half of FIG. 29 illustrates a second half of workpiece 110 at a second time after forming. Referring now to these Figures, the 80° walls 111 have been formed without tearing because connectors 134 in the boundary region 122 have lengthened through plastic strain and the angle they subtend with respect to the edge 136 of the inner region 124 has increased. In other words, the ligaments which make up connectors 134 have become closer to being normal with edge 136. The combination of these effects allows outermost regions of the inner region 124 to draw in towards the 80° walls 111 of the die 140. In doing so the steep walls have more material available underneath forming tool 108 and have not fractured, as would be the case if openings 128 were not cut into the workpiece 110.

As described herein, a system 100 for forming a structure includes the workpiece 110 including the boundary region 122 between the inner region 124 and the outer region 126. The boundary region 122 includes the openings 128 between the connectors 134. The forming tool 108 is configured to operate on the inner region 124 after openings 128 have been cut into the boundary region 122. At least one control unit 102 and/or 103 is in communication with the forming tool 108. Boundary cutting tool control unit 121 is in communication with the boundary region cutting tool 120 during the boundary cutting operation. The at least one control unit 102 and/or 103 operates the forming tool 108 to form the structure from the inner region 124 through one or more incremental sheet forming operations.

Figure 30:
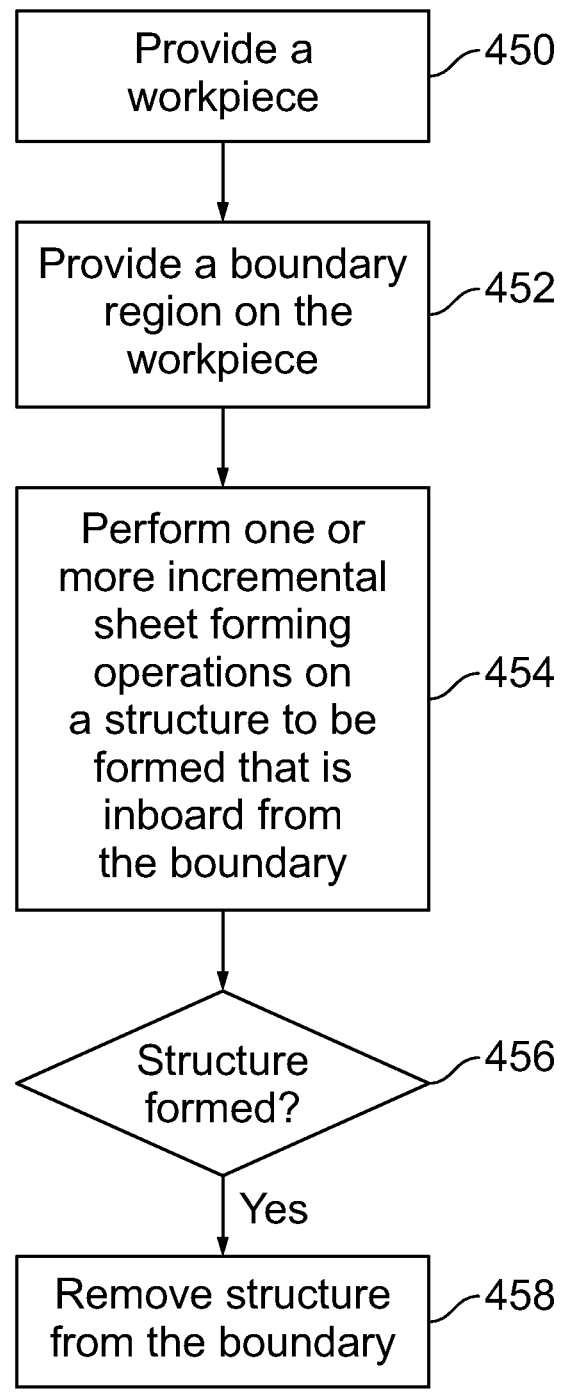
FIG. 30 illustrates a schematic block diagram of an incremental sheet forming system, according to an embodiment of the present disclosure.

FIG. 30 illustrates a flow chart of a method of forming a structure, according to an embodiment of the present disclosure. Referring to FIGS. 1-30, the method begins at 450, at which the workpiece 110 is provided. At 452, boundary region cutting tool 120 creates openings 128 in boundary region 122 of the workpiece 110. The boundary region 122 includes the openings 128 extending between and through the first surface 130 and the second surface 132 of the workpiece 110 (such as shown in FIG. 3B).

In at least one embodiment, the workpiece 110 includes a sheet blank of a given initial thickness. The openings 128 and connecting elements 134 allow for draw-in of material of the workpiece 110 during the incremental sheet forming operation(s), such that the steep wall maintains a thickness that is at least a threshold percentage (such as at least 50%) of the blank thickness.

In at least one embodiment, the boundary region pattern within the boundary region 122 is established based on the structure to be formed, such that the openings 128 and connecting elements 134 allow for draw-in of material of the workpiece 110 during the incremental sheet forming operation(s), such that the steep wall maintains a thickness that is at least a threshold percentage of the blank thickness.

After boundary region cutting tool 120 creates openings 128 in boundary region 122, the method proceeds to 454, at which one or more incremental sheet forming operations are performed by the forming tool 108 on the inner region 124, which is inboard from the boundary region 122. The method proceeds to 458, at which the inner region 124 is separated from the remaining portion of workpiece 110. In at least one embodiment, the inner region 124 includes one or more steep walls. The steep wall(s) have a thickness that is at least a threshold percentage of the blank thickness.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein, which are exemplary only, and are thus not intended to limit in any way the definition and/or meaning of such terms. For example, the tool path generation control unit 102 and the forming control unit 103 can be or include one or more processors that are configured to control operation thereof, as described herein.

The tool path generation control unit 102 and the forming control unit 103 are configured to execute a set of instructions that are stored in one or more data storage units or elements (such as one or more memories), in order to process data. For example, the tool path generation control unit 102, the boundary cutting tool control unit 121, and the forming control unit 103 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the non-volatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the tool path generation control unit 102, the boundary cutting tool control unit 121, and the forming control unit 103 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the tool path generation control unit 102, the boundary cutting tool control unit 121, and the forming control unit 103. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the tool path generation control unit 102 and the forming control unit 103 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-30, embodiments of the present disclosure provide systems and methods for forming a structure. The systems and methods include cutting openings 128 into the boundary region 122 within the workpiece 110. During an incremental sheet forming operation, in which the forming tool 108 operates on the inner region 124 to form the structure, the boundary region 122 provides increased flexibility of workpiece 110 in a direction normal to the toolpath (i.e., lateral to the toolpath). This allows significant draw-in of the sheet blank material. As such, the forming tool 108 need not continually plastically strain the same region of material but can instead draw in fresh sheet blank material, which allows for formation of steep walled parts which were previously not formable using traditional incremental sheet forming approaches. Lateral draw in of the sheet material is achieved by cutting specific patterns (that is, the openings 128 of the boundary region 122) into the workpiece 110 prior to incremental sheet forming operations.

Further, the disclosure comprises embodiments according to the following clauses:

Clause 1. A system for forming a structure, the system comprising:
a workpiece including a boundary region that segregates a portion of the workpiece from a remainder of the workpiece, the boundary region including a plurality of openings and a plurality of connecting elements that connect the portion to the remainder of the workpiece;
a forming tool configured to operate on the portion after the boundary region has been cut into the workpiece; and
at least one control unit configured to command a position of the forming tool, wherein the at least one control unit is configured to operate the forming tool to form the structure through one or more incremental sheet forming operations.

Clause 2. The system of clause 1, further comprising a boundary region cutting tool configured to cut the plurality of openings of the boundary region into the workpiece.

Clause 3. The system of Clauses 1 or 2, wherein the plurality of openings defined by the boundary region are cut between and through a first surface and a second surface of the workpiece, and wherein a normal of the first surface and the second surface is collinear at a point of cutting.

Clause 4. The system of any of Clauses 1-3, wherein one or both of an inner boundary region curve or an outer boundary region curve maintain a fixed offset distance from a perimeter of a die which is projected orthogonally onto the plane of the initial workpiece.

Clause 5. The system of any of Clauses 1-4, wherein the boundary region comprises a plurality of slot openings that follow a shape of a die perimeter, and are staggered with respect to successive nested layers.

Clause 6. The system of any of Clauses 1-4, wherein the plurality of connecting elements comprise a plurality of individual straight ligaments connecting an inner boundary region curve and an outer boundary region curve, the ligaments being connected only at attachment points with the inner boundary region curve and the outer boundary region curve.

Clause 7. The system of Clause 6, wherein centerlines of the connecting elements are aligned toward or collinear with a tangent to the inner boundary region curve at inner attachment points.

Clause 8. The system of any of Clauses 1-4, wherein the boundary region is in the form of a perforated metal sheet, the perforated metal sheet including a repeating unit cell containing a single opening of a specific shape, repeated in one or more sizes.

Clause 9. The system of any of Clauses 1-8, wherein the plurality of connecting elements are extendable ligaments which connect an inner boundary region curve and an outer boundary region curve, the extendable ligaments having a shape in a plane of the workpiece.

Clause 10. The system of any of Clauses 1-4, and 9, wherein each of the plurality of connecting elements intersects at least one other of the plurality of connecting elements.

Clause 11. The system of any of Clauses 1-4, and 9, wherein the plurality of connecting elements include ligaments connected to an inner and outer rim, and wherein the ligaments are arranged in a pattern of spokes.

Clause 12. The system of any of Clauses 1-4, and 9, wherein the connecting elements include curved portions.

Clause 13. The system of any of Clauses 1-12, wherein a structure is removed from the connecting elements after the forming tool forms the structure.

Clause 14. The system of any of Clauses 1-13, wherein the forming tool is a stylus including a bull-nosed or toroidal operative end.

Clause 15. The system of any of Clauses 1-14, wherein the structure includes a steep wall, wherein the steep wall is at is at an angle of at least 60 degrees with respect to a level reference plane.

Clause 16. The system of Clause 15, wherein the workpiece comprises a sheet metal blank of a given initial thickness, and wherein the plurality of openings and the plurality of connecting elements allow for draw-in of material of the workpiece during the one or more incremental sheet forming operations such that the steep wall maintains a thickness that is at least a threshold percentage of the blank thickness.

Clause 17. The system of Clauses 15 or 16, wherein the threshold percentage is at least 50%.

Clause 18. A method for forming a structure, the method comprising:
cutting a boundary region pattern between an inner boundary region curve and outer boundary region curve on a workpiece, wherein the boundary region pattern includes a plurality of openings and a plurality of connecting elements; and performing, using a forming tool, one or more incremental sheet forming operations on the structure to be formed in order to form the structure, wherein the cutting and the performing are conducted after the boundary region pattern has been established.

Clause 19. The method of Clause 18, wherein the cutting generates openings between and through a first surface and a second surface of the workpiece, the cutting direction being normal to one or both of the first or second surface at the point of cutting.

Clause 20. The method of Clauses 18 or 19, further comprising establishing the boundary region pattern based on the structure to be formed, wherein the plurality of openings and the plurality of connecting elements allow for draw-in of material of the workpiece during the one or more incremental sheet forming operations such that a steep wall of the formed structure maintains a thickness that is at least a threshold percentage of a blank thickness of the workpiece.

Clause 21. A computer program comprising computer instructions that, when executed by a computer processor, cause the computer processor to perform the method of any Clauses 18-20, or a computer readable medium having stored thereon such a computer program.

Clause 22. A method of cutting a boundary region into a workpiece, wherein the boundary region includes a plurality of openings between a plurality of connecting elements, the method comprising:
  receiving, by a boundary region cutting tool, boundary region data indicative of the boundary region; and
  operating, by the boundary region cutting tool, on the workpiece according to the boundary region data to provide the boundary region.

Clause 23. The method of Clause 22, wherein the boundary region cutting tool comprises a waterjet cutter, laser cutter, or a milling machine.

Clause 24. The method of Clause 23, wherein the operating comprises drilling.

Clause 25. The method of Clause 24, wherein the operating comprises chemical etching or chemical milling.

Clause 26. The method of any of Clauses 22-25, wherein the operating comprises electrical discharge machining.

Clause 27. The method of any of Clauses 22-26, wherein the boundary region data is selected based on a structure to be formed through one or more incremental sheet forming operations, such that the plurality of openings and the plurality of connecting elements allow for draw-in of material of the workpiece during the one or more incremental sheet forming operations such that a steep wall of the structure maintains a thickness that is at least a threshold percentage of a blank thickness of the workpiece.

Clause 28. A computer program comprising computer instructions that, when executed by a computer processor, cause the computer processor to perform the method of any of Clauses 22-27, or a computer readable medium having stored thereon such a computer program.

Clause 29. A method comprising:
  selecting boundary region data based on a structure to be formed through one or more incremental sheet forming operations, wherein the boundary region data relates to a boundary region that includes a plurality of openings and a plurality of connecting elements that allow for draw-in of material of a workpiece during one or more incremental sheet forming operations such that a steep wall of the structure maintains a thickness that is at least a threshold percentage of a blank thickness of the workpiece.

Clause 30. A computer program comprising computer instructions that, when executed by a computer processor, cause the computer processor to perform the method of Clause 29, or a computer readable medium having stored thereon such a computer program.

As described herein, embodiments of the present disclosure provide systems and methods of forming a structure having steep walls (for example, walls angled at sixty degrees or greater relative to a level, reference plane) through incremental sheet forming. The level reference plane may be, for example, an X-Y plane. Further, embodiments of the present disclosure provide incremental sheet forming systems and methods that are less susceptible to damaging (for example, tearing) structural material at steep angles (for example, sixty degrees or greater relative to a level, reference plane).

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for forming a structure, the system comprising:
   a workpiece including a boundary region between an inner region and an outer region, the boundary region including a plurality of openings and a plurality of connecting elements that connect the portion to the remainder of the workpiece;
   a die having a base, wherein the boundary region conforms to a perimeter of the base of the die;
   a forming tool configured to operate on the portion after the boundary region has been cut into the workpiece; and
   at least one control unit configured to command a position of the forming tool, wherein the at least one control unit is configured to operate the forming tool to form the inner region as the structure through one or more incremental sheet forming operations, and
   wherein the boundary region and the outer region are configured to be removed from the structure after the inner region is formed as the structure.

2. The system of claim 1, further comprising a boundary region cutting tool configured to cut the plurality of openings of the boundary region into the workpiece.

3. The system of claim 1, wherein the plurality of openings defined by the boundary region are cut between and through a first surface and a second surface of the workpiece, the cutting direction being normal to one or both of the first or second surface at the point of cutting.

4. The system of claim 1, wherein one or both of an inner boundary region curve or an outer boundary region curve are a fixed distance from the perimeter of the die which is projected orthogonally onto the plane of the workpiece.

5. The system of claim 1, wherein the plurality of openings comprises a plurality of slot openings that follow a shape of the perimeter of the die, and are staggered with respect to successive layers of openings.

6. The system of claim 1, wherein the plurality of connecting elements of the workpiece before being operated on by the forming tool comprise a plurality of individual straight ligaments connecting an inner boundary region curve and an outer boundary region curve, wherein the plurality of openings include straight edges defined by the plurality of straight ligaments, each of the plurality of straight ligaments being connected only at attachment points with the inner boundary region curve and the outer boundary region curve.

7. The system of claim 6, wherein centerlines of the connecting elements are aligned toward or collinear with a tangent to the inner boundary region curve at inner attachment points.

8. The system of claim 1, wherein the boundary region comprises a perforated metal sheet having the plurality of openings and the plurality of connecting elements, the perforated metal sheet including a repeating unit cell including the plurality of openings having different sizes.

9. The system of claim 1, wherein the plurality of connecting elements are ligaments which connect an inner boundary region curve and an outer boundary region curve, the ligaments having a shape in a plane of the workpiece.

10. The system of claim 1, wherein each of the plurality of connecting elements intersects at least one other of the plurality of connecting elements.

11. The system of claim 1, wherein the plurality of connecting elements include ligaments connected to an inner and outer rim, and wherein the ligaments are arranged in a pattern of spokes.

12. The system of claim 1, wherein the connecting elements include curved portions.

13. The system of claim 1, wherein the forming tool is a stylus including a bull-nosed or toroidal operative end.

14. The system of claim 1, wherein the structure includes a steep wall connected to a flange, wherein the steep wall is at is at an angle of at least 60 degrees with respect to the flange.

15. The system of claim 14, wherein the workpiece comprises a sheet metal blank having an initial thickness, and wherein the plurality of openings and the plurality of connecting elements allow for draw-in of material of the workpiece during the one or more incremental sheet forming operations.

16. The system of claim 14, wherein the steep wall is at least 50% of the thickness of the initial thickness of the sheet metal blank.

17. The system of claim 1, wherein at least a portion of the boundary region is supported over and on the base of the die.

18. A method for forming a structure, the method comprising:
   forming a boundary region between an inner region and an outer region of a workpiece, wherein said forming comprises cutting a pattern between an inner boundary region curve and outer boundary region curve of the boundary region, wherein the pattern includes a plurality of openings and a plurality of connecting elements;
   supporting the workpiece on a die such that the boundary region conforms to a perimeter of a base of the die;
   performing, using a forming tool, one or more incremental sheet forming operations on the workpiece, wherein said performing is conducted after the boundary region pattern has been established; and
   removing the boundary region after said performing to form the structure.

19. A method of cutting a boundary region into a workpiece, wherein the boundary region includes a plurality of openings between a plurality of connecting elements, the method comprising:
   receiving, by a boundary region cutting tool, boundary region data indicative of the boundary region;
   operating, by the boundary region cutting tool, on the workpiece according to the boundary region data to provide the boundary region, wherein the boundary region comprises openings and connecting elements;
   supporting the workpiece having the boundary region on a die such that the boundary region conforms to a perimeter of a base of the die, wherein at least a portion of the boundary region is supported on the base of the die;
   performing, using a forming tool, one or more incremental sheet forming operations on the workpiece; and
   removing the boundary region after said performing to form the structure.

20. The method of claim 19, further comprising:
   selecting the boundary region data based on the structure to be formed through the one or more incremental sheet forming operations, wherein the boundary region data relates to the boundary region that includes the openings and the connecting elements that allow for draw-in of material of the workpiece during the one or more incremental sheet forming operations such that a steep wall of the structure has a thickness that is at least 50% of a blank thickness of the workpiece.

* * * * *